US006470175B1

(12) United States Patent
Park et al.

(10) Patent No.: US 6,470,175 B1
(45) Date of Patent: Oct. 22, 2002

(54) FLIP-UP TYPE PORTABLE PHONE AND HINGE MECHANISM THEREOF

(75) Inventors: Sung-Sun Park; Kwang-Jin Bae, both of Kumi-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/222,392

(22) Filed: Dec. 29, 1998

(30) Foreign Application Priority Data

Dec. 29, 1997 (KR) ............................................. 97-76184
Aug. 18, 1998 (KR) ............................................. 98-33478

(51) Int. Cl.⁷ ................................................ H04B 1/38
(52) U.S. Cl. ..................... 455/90; 455/575; 379/433.13
(58) Field of Search ......................... 455/90, 550, 575, 455/462; 379/428, 430, 433, 433.12, 433.13; D14/137, 138

(56) References Cited

U.S. PATENT DOCUMENTS

| | | | | |
|---|---|---|---|---|
| 5,752,204 A | * | 5/1998 | Epperson et al. | 455/575 |
| 5,809,403 A | * | 9/1998 | MacDonald, Jr. et al. | 455/90 |
| 5,896,575 A | * | 4/1999 | Higginbotham et al. | 455/575 |
| 5,960,357 A | * | 9/1999 | Kim | 455/462 |
| 6,091,964 A | * | 7/2000 | Frohlund | 455/550 |
| 6,125,289 A | * | 9/2000 | Lee | 455/575 |
| 6,141,540 A | * | 10/2000 | Richards et al. | 455/575 |

OTHER PUBLICATIONS

"Webster's II New Riverside University Dictionary", p. 321, 1988.

* cited by examiner

Primary Examiner—Nay Maung
(74) Attorney, Agent, or Firm—Dilworth & Barrese, LLP

(57) ABSTRACT

A flip-up type portable phone and a hinge mechanism for opening and closing a flip cover of such a flip-up type portable phone. A speaker is mounted in the interior of the flip cover, so that the space for occupying the speaker is eliminated from a phone body, thereby enabling the phone body to be compact. The hinge mechanism includes a pair of hinge assemblies adapted to open and close a flip cover and arranged at opposite sides of a liquid crystal display module disposed at the upper portion of the phone body, so that the flip cover can be opened by an upward pivotal movement thereof carried out about hinge shafts arranged at opposite sides of the LCD module. Accordingly, a microphone unit can be arranged at the lower end of the phone body. Moreover, the microphone unit can be arranged at an optional position on the lower end of the phone body. In accordance with the above arrangement, the LCD unit is always exposed.

25 Claims, 28 Drawing Sheets

FLIP-UP TYPE PORTABLE PHONE AND HINGE MECHANISM THEREOF

BACKGROUND OF THE INVENTION

1. Field of the Invention

The present invention relates to a flip-up type portable phone, and more particularly to a hinge mechanism for opening and closing a flip cover of such a flip-up type portable phone.

2. Description of the Related Art

Currently, portable phone units such as CT-2 and PCS phones are widely used. For such portable phones, there is a bar type construction and a flip type construction. Although both the bar type and flip type portable phones are currently used, the tendency toward the use of flip type portable phones is increasing gradually.

The reason why the use of flip type portable phones is currently increasing is because a flip cover provided at a phone body serves to protect a plurality of keys on the phone body while also serving as a reflecting plate for sound, thereby enhancing the sound sensitivity. In addition, the flip type construction provides advantageous features in terms of a compactness in the phone body.

Such flip type portable phones have a construction in which the flip cover has a hinge shaft arranged at the lower end of the phone body. That is, the flip cover is pivotally coupled to a hinge mechanism mounted to the lower end of the phone body so that it is pivotally moved between an open position and a closed position.

In the future, such portable phones will have a more compact and light construction while maintaining a given distance between the speaker and the microphone. The distance between the speaker and the microphone is so called a "conversation distance" and may be about 14 cm.

An example of such a hinge mechanism used in flip type portable phones to open and close the flip cover by a desired conversation angle is disclosed in U.S. Pat. No. 5,629,979 issued to James D. Domoleczny and assigned to Motorola, Inc., U.S.A. However, this hinge mechanism has a problem in that it occupies a large portion of the phone body. For this reason, such a hinge mechanism is unfavorable to compactness of portable phones. Furthermore, this hinge mechanism gives a restriction in design because it is configured to mount the hinge shaft of the flip cover to the lower end of the phone body.

Another hinge mechanism for flip type portable phones configured to open and close the flip cover from the phone body by a desired conversation angle is disclosed in U.S. Pat. No. 5,661,797 issued to Ari Leman et al and assigned to Nokia Mobile Phones Ltd., Finland. Similar to the above mentioned case, this hinge mechanism is arranged at the lower end of the phone body. As a result, there is a problem in that the hinge mechanism occupies a large portion of the phone body. Therefore, such a hinge mechanism is unfavorable to compactness of portable phones. This hinge mechanism also gives a restriction in design because it is configured to mount the hinge shaft of the flip cover to the lower end of the phone body.

The above mentioned problems involved in conventional constructions are opposed to the compactness and lightness in construction required for the competitiveness of portable phones. In other words, such problems result in a degradation in the competitiveness of portable phones. Moreover, conventional flip type constructions restrict a diversification in design considered to be important in portable phones.

SUMMARY OF THE INVENTION

Accordingly, the present invention has been made in view of the above mentioned problems, and an object of the present invention is to provide a flip-up type portable phone in which a speaker is mounted in the interior of a flip cover, so that the space for occupying the speaker is eliminated from a phone body, thereby enabling the phone body to be compact.

Another object of the invention is to provide a hinge mechanism for a flip-up type portable phone in which a pair of hinge assemblies adapted to open and close a flip cover are arranged at opposite sides of a liquid crystal display (LCD) module disposed at the upper portion of a phone body, so that the flip cover can be opened by an upward pivotal movement thereof carried out about hinge shafts arranged at opposite sides of the LCD module.

Another object of the invention is to provide a hinge mechanism for a flip-up type portable phone including a hinge assembly arranged at one side of an LCD module disposed at the upper portion of a phone body or a pair of hinge assemblies arranged at opposite sides of the LCD module, the hinge assembly or assemblies providing a hinge shaft or shafts for a flip cover.

Another object of the invention is to provide a hinge mechanism for a flip-up type portable phone including a pair of hinge assemblies arranged at opposite sides of an LCD module disposed at the upper portion of a phone body, each of the hinge assemblies having a rectangular parallelepiped structure.

Another object of the invention is to provide a flip-up type portable phone having a design according to a novel concept, thereby overcoming a design limitation involved in portable phone constructions themselves.

Another object of the invention is to provide a flip cover for a flip-up type portable phone capable of containing a speaker therein, and allowing the speaker to be electrically connected to a phone body.

Another object of the invention is to provide a flip-up type portable phone in which a speaker is spaced and isolated from an antenna unit mounted to a phone body, so that it is subjected to minimum electric wave influence by the antenna unit.

Another object of the invention is to provide a flip-up type portable phone in which a speaker is spaced and isolated from a battery pack separably attached to the back surface of a phone body, so that its influence by heat generated from the battery pack is minimized.

In accordance with one aspect, the present invention provides a flip up type portable phone comprising: a phone body including an antenna unit arranged at an upper end of said phone body, a liquid crystal display module arranged below said antenna unit, said liquid crystal display module serving as output means for allowing a user to identify an output displayed thereon, a key pad arranged below said liquid crystal display module, said key pad serving as input means, and a microphone unit arranged below said key pad; a flip cover mounted to said phone body in such a fashion that it is opened and closed with respect to said phone body without covering said liquid crystal display module, said flip cover serving to protect said key pad; a pair of hinge means mounted to said phone body at opposite sides of said liquid crystal display module, respectively, said hinge means serving to mechanically couple said flip cover to said phone body; and fixing means for fixing said flip cover to said hinge means; whereby said liquid crystal display module is always exposed so that said output displayed thereon is always identified irrespective of an opened or closed state of said flip cover.

In accordance with another aspect, the present invention provides a hinge mechanism for a flip-up type portable phone comprising: a hinge housing made of a metal material and provided with a plurality of locking protrusions formed using a slitting process; a first cover made of a plastic material and assembled in said hinge housing, said first cover having a plurality of locking holes formed at positions corresponding to those of said locking protrusions in an assembled state of said first cover, so that said locking holes are engaged with said locking protrusions in said assembled state, respectively, said first cover also having additional locking holes; a hinge shaft arranged in such a fashion that it extends transversely through said first cover and said hinge housing, said hinge shaft having an inner end disposed in a space defined by said first cover assembled in said hinge housing, and an outer end disposed outside said space and provided with a coupling member centrally having a coupling hole; a hinge cam fixed to said inner end of said hinge shaft and provided with opposite curved surfaces, and opposite flat surfaces arranged in an alternating manner with said curved surfaces, one of said curved surfaces having an inflection point at a position spaced by a predetermined angle in an opening direction of a flip cover included in said phone from a position corresponding to a predetermined angular position of said flip cover, so that said flip cover is not stopped at said predetermined angular position during opening and closing movements thereof; a plate spring interposed between said hinge cam and a side wall formed at one end of said hinge housing and adapted to apply an elastic force to said hinge cam at one side of said hinge cam, said plate spring being in slidable surface contact with said surfaces of the hinge cam during a rotation of said hinge cam; first elastic means arranged at the other side of said hinge cam and adapted to apply an elastic force to said hinge cam at said other side of said hinge cam, said first elastic means being sequentially compressed and stretched in said space defined by said first cover during said rotation of said hinge cam; and a second cover made of a metal material and adapted to support said first elastic means at the other end of said hinge housing, said second cover having locking protrusions formed at positions corresponding to those of said additional locking holes of said first cover and engaged with said locking protrusions, respectively, so that it is coupled to said first cover.

BRIEF DESCRIPTION OF THE DRAWINGS

The foregoing and other objects, features and advantages of the present invention will become more apparent from the following detailed description when taken in conjunction with the accompanying drawings in which:

FIG. 6b is an exploded perspective view illustrating the configuration of the flip cover shown in FIG. 6a;

FIGS. 11a to 14b illustrate operation states of the hinge assemblies according to an embodiment of the present invention, in which a first elastic means applying an elastic force to the hinge cam of each hinge assembly comprises an S-shaped plate spring, wherein FIGS. 11a and 11b show a closed state of the flip cover on the phone body, FIGS. 14a and 14b show respective operation states of the hinge assemblies when the flip cover is in a completely opened state;

FIGS. 15a to 18b illustrate operation states of the hinge assemblies according to another embodiment of the present invention, in which the first elastic means comprises a C-shaped plate spring, wherein FIGS. 15a and 15b show a closed state of the flip cover on the phone body, FIGS. 18a and 18b show respective operation states of the hinge assemblies when the flip cover is in a completely opened state;

FIGS. 19a to 22b illustrate operation states of the hinge assemblies according to another embodiment of the present invention, in which the first elastic means comprises a compression coil spring, wherein FIGS. 19a and 19b show a closed state of the flip cover on the phone body, FIGS. 22a and 22b show respective operation states of the hinge assemblies when the flip cover is in a completely opened state; and FIGS. 23a to 26b illustrate operation states of the hinge assemblies according to another embodiment of the present invention, in which the first elastic means comprises a trapezoidal elastic member made of a urethane material, wherein FIGS. 23a and 23b show a closed state of the flip cover on the phone body, FIGS. 26a and 26b show respective operation states of the hinge assemblies when the flip cover is in a completely opened state.

DETAILED DESCRIPTION OF PREFERRED EMBODIMENTS

Figure 1A:
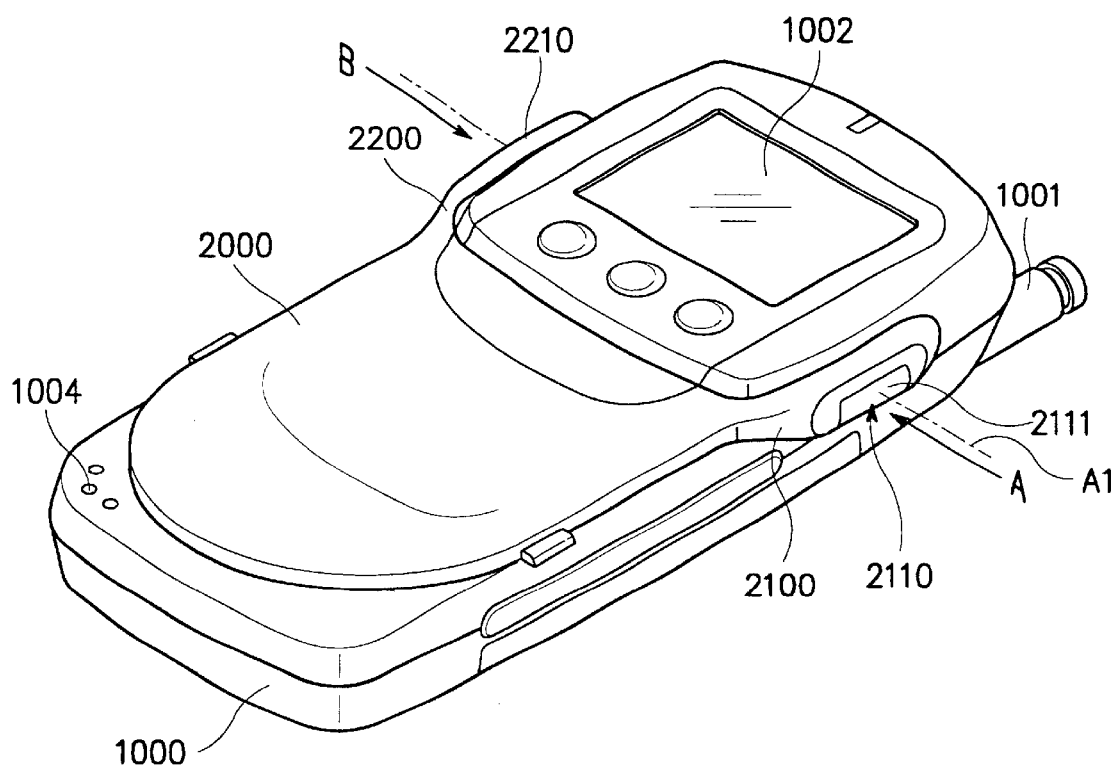
FIG. 1a is a perspective view illustrating a flip-up type portable phone in accordance with a preferred embodiment of the present invention, which is in an on-hook state.

Reference will now be made in detail to the preferred embodiments of the present invention. In the drawings, the same elements are denoted by the same reference numerals even though they are depicted in different drawings. In the following description of the present invention, a detailed description of known functions and configurations incorporated herein will be omitted when it may make the subject matter of the present invention rather unclear.

FIG. 1a is a perspective view illustrating a flip-up type portable phone in accordance with a preferred embodiment of the present invention, which is in an on-hook state. On the other hand, FIG. 1b is a perspective view of the flip-up type portable phone which is in an off-hook state.

Figure 1B:
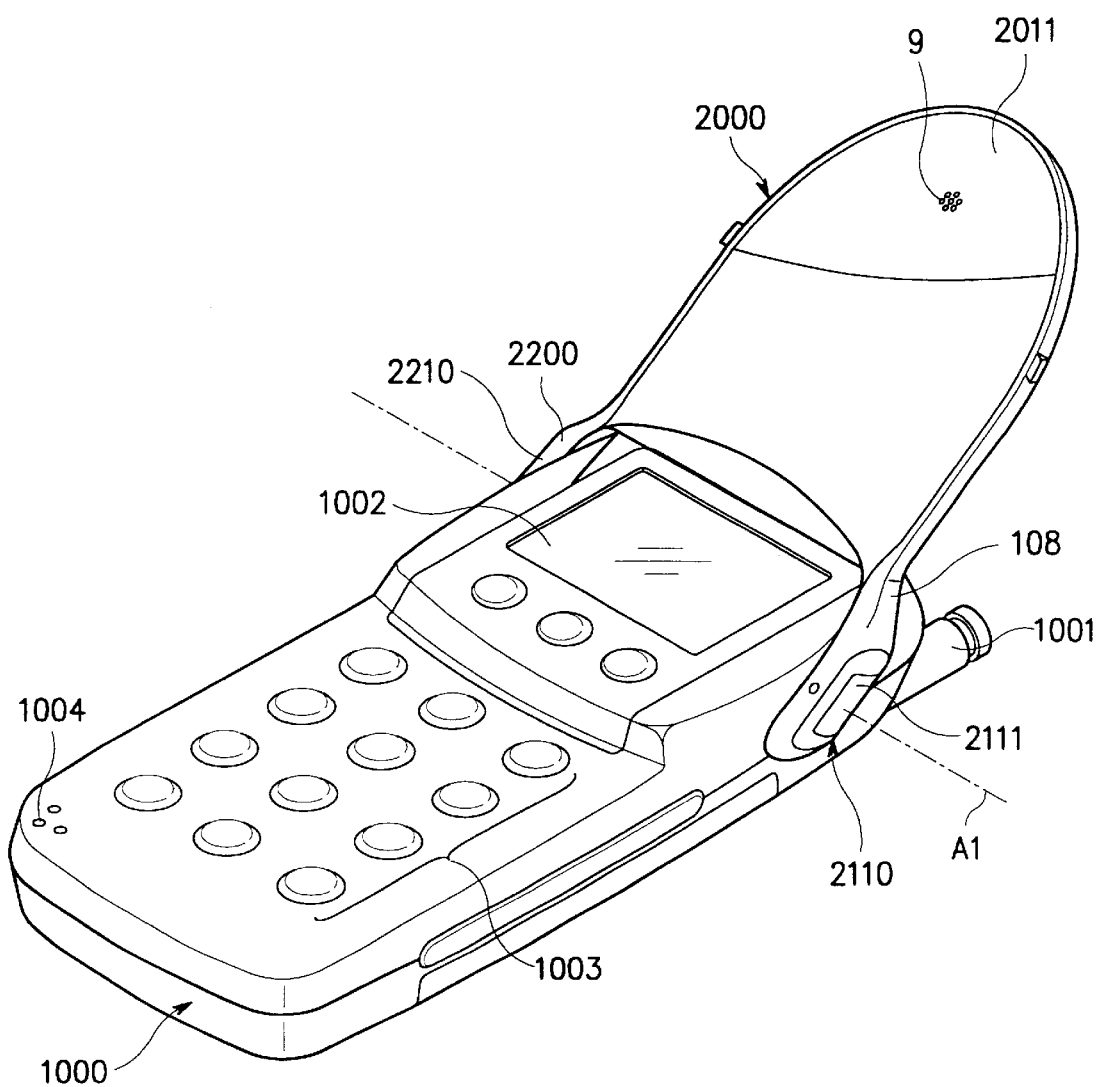
FIG. 1b is a perspective view of the flip-up type portable phone shown in FIG. 1a, which is in an off-hook state.

Referring to FIGS. 1a and 1b, the flip-up type portable phone includes a phone body 1000, a flip cover 2000, and a hinge mechanism for mechanically connecting the flip cover 2000 to the phone body 1000.

Figure 2:
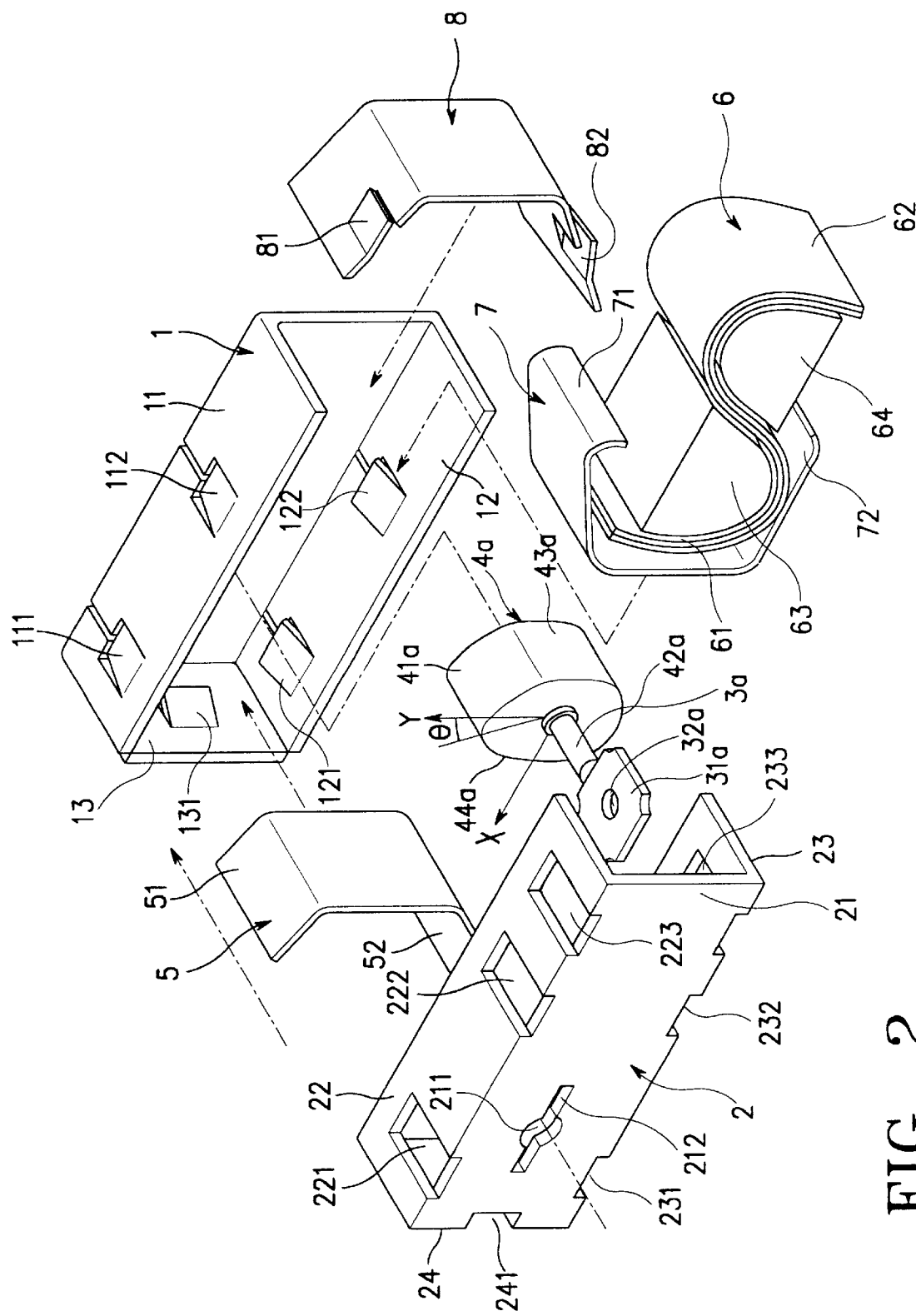
FIG. 2 is an exploded perspective view of one hinge assembly included in a hinge mechanism according to a preferred embodiment of the present invention.

An antenna unit 1001 is mounted to the upper end of the phone body 1000. An LCD module 1002, which is an output unit, is arranged on the phone body 1000 below the antenna unit 1001. In the drawings, an LCD window of the LCD module 1001 is only shown. A pair of hinge assemblies not shown are mounted to the phone body 100 at opposite sides of the LCD module 1001, respectively. These hinge assemblies are shown in FIG. 2. A key pad 1003, which is an input unit provided with numeral keys and function keys, is arranged on the phone body 1000 below the LCD module 1001. A microphone unit 1004 is also mounted to the lower end of the phone body 1000. The microphone unit 1004 may be arranged at an optional position, for example, a left or right position, on the lower end of the phone body 1000.

As apparent from the above description, the portable phone of the present invention is configured in such a fashion that the flip cover 2000 is opened as it moves pivotally about its hinge shafts A1 in an upward direction, namely, from a lower position near the microphone unit 1004 to an upper position near the antenna unit 1001. The hinge shafts A1 of the flip cover 2000 are arranged at opposite sides of the LCD module 1002.

The portable phone of the present invention is also configured in such a fashion that its LCD module 1002 is always exposed irrespective of the opened or closed state of the flip cover 2000. That is, the user can always view the output of the LCD module 1002 irrespective of the opened or closed state of the flip cover 2000.

Furthermore, the mounting position of the microphone unit 1004 can also be optionally determined because there is no hinge mechanism at the lower end of the phone body 1000 in accordance with the present invention. That is, the microphone unit 1004 may be installed at the central, left or right position on the lower end of the phone body 1000. Such a variation in the mounting position of the microphone unit 1004 provides a convenience in use to the user.

The hinge assemblies are coupled to knuckles 2110 and 2210 formed at respective ends of necks 2100 and 2200 of the flip cover 2000 by means of flip dummy members 2111 and set screws (shown in FIG. 4), respectively. The necks 2100 and 2200 extend longitudinally from the upper end of the flip cover 2000 at opposite lateral ends of the flip cover 2000, respectively, so that the LCD module 1002 is exposed therebetween without being shielded by the flip cover 2000 moving pivotally about its hinge shafts A1. The knuckles 2110 and 2210, which are provided at respective ends of the necks 2100 and 2200, are coupled to the hinge mechanism installed in the phone body 1000. These knuckles 2110 and 2210 are fixedly mounted to the hinge assemblies of the hinge mechanism by means of the flip dummy members 2111 respectively laterally fitted in the knuckles 2110 and 2210.

Figure 3:
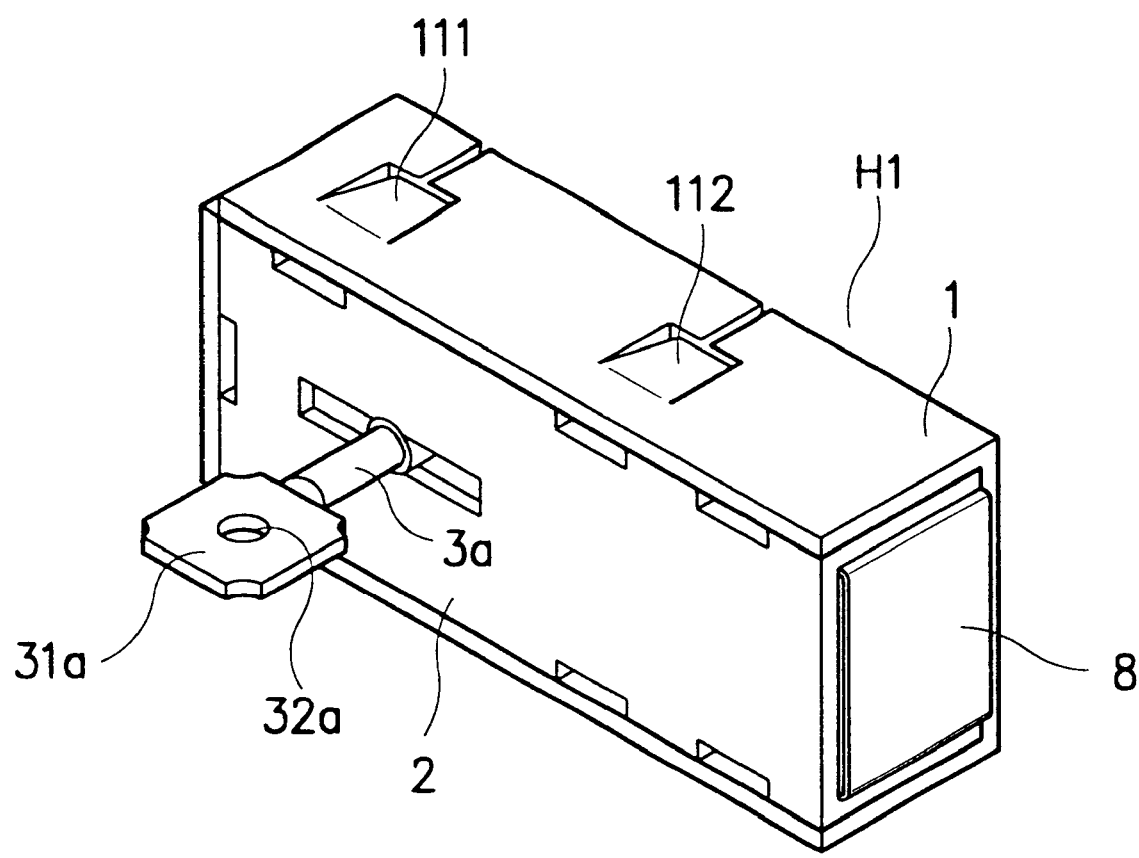
FIG. 3 is an assembled perspective view of the hinge assembly shown in FIG. 2.

FIG. 2 is an exploded perspective view of one hinge assembly included in the hinge mechanism according to a preferred embodiment of the present invention whereas FIG. 3 is an assembled perspective view of the hinge assembly shown in FIG. 2.

Figure 4:
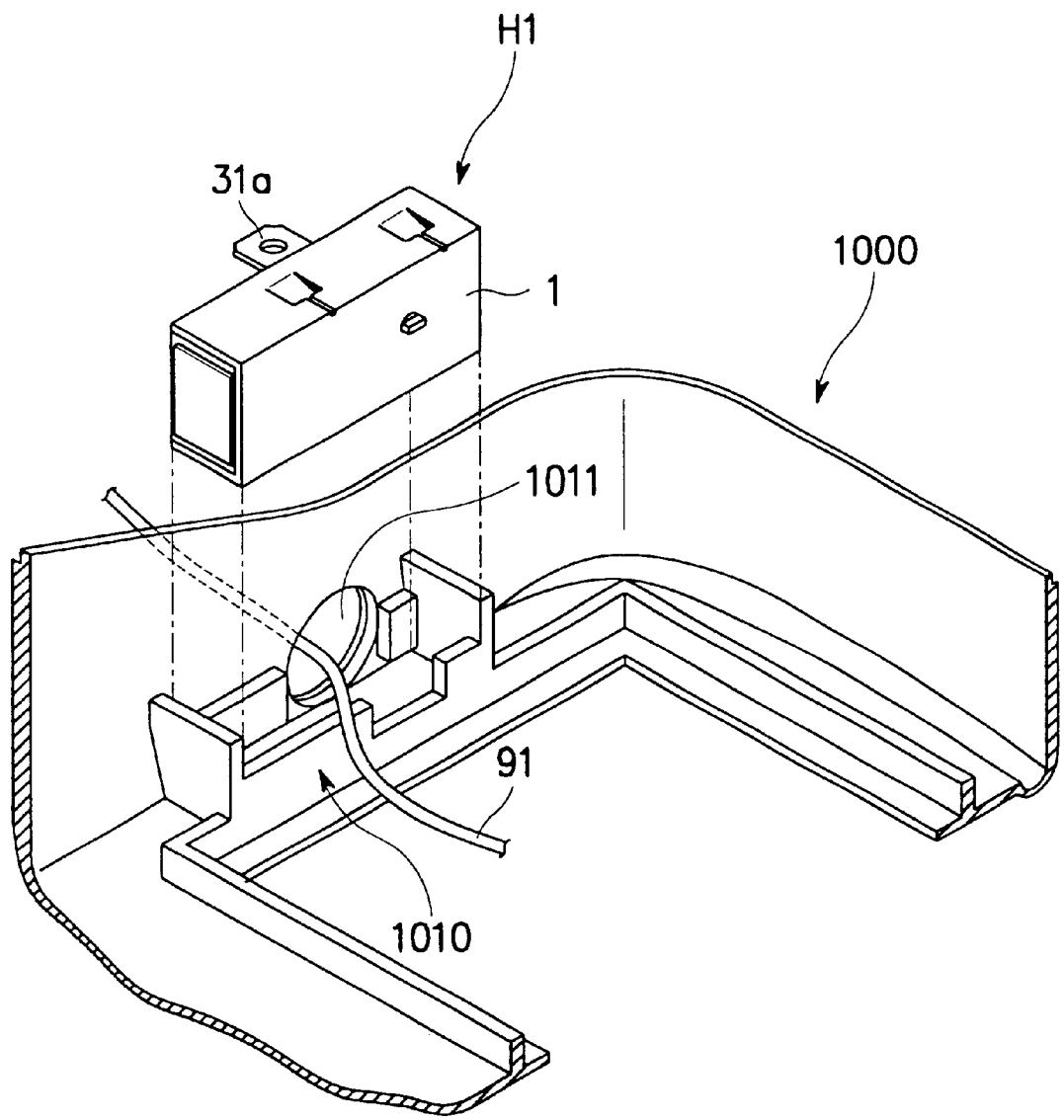
FIG. 4 is a perspective view illustrating a state in which the hinge assembly of FIG. 3 is assembled in a mounting part of a phone body.
Figure 5:
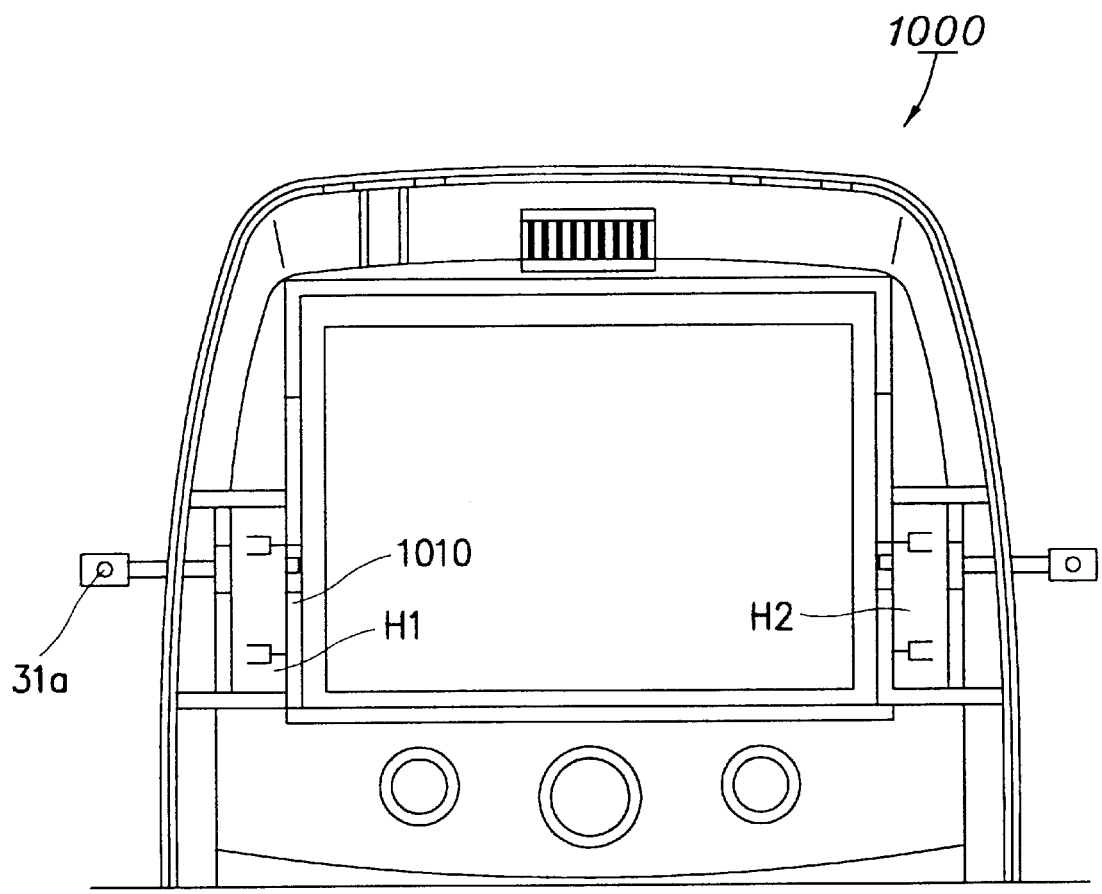
FIG. 5 is a plan view illustrating an assembled state of hinge assemblies having a construction of FIG. 2 in the phone body.

FIG. 4 is a perspective view illustrating a state in which the hinge assembly of FIG. 3 is assembled in a mounting part of the phone body. On the other hand, FIG. 5 is a plan view illustrating the assembled state of the hinge assembly in the phone body.

As mentioned above, the hinge mechanism of the present invention includes a pair of hinge assemblies mounted in respective mounting parts of the phone body in a symmetrical manner. Since these hinge assemblies have the same configuration, they will be described hereinafter in conjunction with only one of them, namely, the hinge assembly H1.

Referring to FIGS. 2 and 3, the hinge assembly H1 includes a box-shaped hinge housing 1 opened at the front portion thereof and one lateral portion thereof, a first cover 2 fitted in the hinge housing 1 through the opened front portion of the hinge housing 1, and a hinge shaft 3a provided at one end thereof with a hinge cam 4a interposed between the hinge housing 1 and first cover 2 assembled together. In a space defined by the assembled hinge housing 1 and first cover 2, a plate spring 5 is arranged at one side of the hinge cam 4a. Opposite to the plate spring 5, a first elastic means 6 and a guide member 7 are arranged at the other side of the hinge cam 4a. A second cover 8 is also assembled in the first cover 2 in such a fashion that it is arranged laterally outwardly of the first elastic means 6. The second cover 8 serves to close the opened lateral portion of the hinge housing 1, thereby retaining the elements received in the hinge housing 1. A pair of second elastic means 8 are also provided at the first elastic means 6.

The hinge housing 1 is fabricated by appropriately pressing and bending a metal plate. The hinge housing 1 has a plurality of locking protrusions 111, 112, 121 and 122 formed at upper and lower walls thereof. These locking protrusions are formed using a slitting process in such a fashion that they face vertically in pair. Another locking protrusion 131 is also formed at a side wall 13 of the hinge housing 1. The formation of this locking protrusion 131 is also achieved using the slitting process. Since each of these locking protrusions 111, 112, 121, 122, and 131 is formed using the slitting process, it has an end protruded toward the interior of the hinge housing 1, so that it has an elasticity at that end. Accordingly, the locking protrusions serve to lock the first cover 2 in an assembled state in the hinge housing 1.

The first cover 2, which is assembled in the hinge housing 1, is made of a transparent hard plastic material. The first cover 2 is provided at upper and lower walls 22 and 23 thereof with locking holes 221, 222, 231, and 232. These locking holes 221, 222, 231, and 232 are arranged at positions respectively corresponding to those of the locking protrusions 111, 112, 121, and 122 so that they are engaged with those locking protrusions, respectively. The first cover 2 is also provided at the upper and lower walls 22 and 23 thereof with locking holes 223 and 233, respectively. The locking holes 223 and 233 are arranged at positions respectively corresponding to those of locking protrusions 81 and 82 formed at the second cover 8 so that they are engaged with those locking protrusions 81 and 82, respectively. Another locking hole 241 is also formed at a side wall 24 of the first cover 2 so that it is engaged with the locking protrusion 131 provided at the side wall 13 of the hinge housing 1. The first cover 2 is also provided at the front wall 21 thereof with a shaft hole 211 for receiving the hinge shaft 3a. In order to rotatably support one end of the hinge shaft 3a extending into the interior of the hinge housing 1, the hinge housing 1 is also provided at the rear wall thereof with a shaft hole (not shown) for receiving the end of the hinge shaft 3a. A slot 212 extends laterally from opposite sides of the shaft hole 211 formed at the first cover 2, in order to allow a coupling member 31a fixed to the other end of the hinge shaft 3a to pass therethrough upon assembling the hinge shaft 3a. The slot 212 also serves as a port for supplying a lubricant around the hinge shaft 3a.

As mentioned above, the hinge shaft 3a is fixedly mounted with the hinge cam 4a at its portion disposed near one end thereof and with the coupling member 31a at the other end thereof The coupling member 31a is centrally provided with a coupling hole 32a.

The hinge cam 4a has a pair of opposite curved surfaces 41a and 42a, and a pair of opposite flat surfaces 43a and 44a. The curved surfaces 41a and 42a are spaced from the axis of the hinge shaft 3a by distances greater than those of the flat surfaces 43a and 44a throughout all portions thereof, respectively. One of the curved surfaces, namely, the curved surface 41a, is formed to have an inflection point at a position where it is spaced by a certain angle, for example, about 10°, in an opening direction of the flip cover 2000 from the Y-axis of an X-Y coordinate having an origin corresponding to the axis of the hinge shaft 3a. The X-Y coordinate is defined when the hinge cam 4a is positioned in a state in which its flat surfaces 43a and 44a extend vertically. In the case of FIG. 2, the angle of "0" is about 10°. Although being described hereinafter, this angle is to prevent the flip cover 2000 from being stopped at a certain angular position during its opening and closing movements.

In a state in which the first cover 2 is assembled in the hinge housing 1, the hinge shaft 3a extends transversely through the first cover 2 and hinge housing 1. In this state, the plate spring 5 and first elastic means 6 are arranged at opposite sides of the hinge cam 4a fixedly mounted on the hinge shaft 3a. The extending direction of the hinge shaft 3a is perpendicular to the arranging direction of the plate spring 5 and first elastic means 6. In the illustrated case, the first elastic means 6 comprises a plate spring having a S-shaped cross section. The plate spring 6 is adapted to be compressed or expanded in accordance with a pivotal movement of the flip cover 2000.

The plate spring 5 is normally interposed between the flat surface 44a of the hinge cam 4a and the inner surface of the side wall 24 of the first cover 2, thereby applying an elastic force to the hinge cam 4a. On the other hand, the first elastic means 6 is normally interposed between the flat surface 43a of the hinge cam 4a and the second hinge cover 8, thereby applying an elastic force to the hinge cam 4a. The guide member 7 is normally arranged between the flat surface 43a of the hinge cam 4a and one end 61 of the first elastic means 6. By virtue of this guide member 7, accordingly, the compression and extension of the first elastic means 6 can be more smoothly carried out along a desired path corresponding to the elastic force applying direction. The guide member 7 carries out straight reciprocal movements in the interior of the first cover 1 while being in slidable surface contact with the hinge cam 4a.

The plate spring 5 is made of a metal material, such as carbon steel, exhibiting an elasticity. The plate spring 5 has a U-shaped cross section (illustrated in a 90°-inverted state in FIG. 2). This plate spring 5 is supported by the side wall 24 of the first cover 2 at both free ends 51 and 52 thereof. The plate spring 5 is also in slidable surface contact with the hinge cam 4a at a middle portion 53 thereof.

As mentioned above, the first elastic means 6 comprises a plate spring having an S-shaped cross section. This first elastic means 6 is in slidable surface contact with the guide member 7 at one end 61 thereof and with the second cover 8 at the other end 62 thereof. The guide member 7 is made of a metal material and arranged in such a fashion that it surrounds the end 61 of the first elastic means 6. The guide member 7 is inwardly bent at both ends 71 and 72 thereof so that it slides smoothly while surrounding the end 61 of the first elastic means 6. Preferably, the first elastic means 6 has a multi-ply structure having at least two plies in order to provide a strong elastic force to the hinge cam 4a being in slidable surface contact therewith. In the illustrated case, the first elastic means 6 has a double-ply structure.

A pair of second elastic means 63 and 64 are arranged in respective spaces defined by the upper and lower surfaces of the first elastic means 6 between opposite ends of the first elastic means 6. The second elastic means 63 and 64 are adapted to minimize a fatigue phenomenon occurring at portions of the first elastic means 6, which have a minimum radius of curvature, when the first elastic means 6 conducts a compression or extension movement in accordance with a rotation of the hinge cam 4a. Since the first elastic means 6 has an S-shaped cross section, it is subjected to the above mentioned fatigue phenomenon at two positions thereof. To this end, the two second elastic means 63 and 64 are arranged at the above mentioned two positions of the first elastic means 6.

Most preferably, the second elastic means 63 and 64 are made of an urethane material. The second elastic means 63 and 64 have shapes respectively conforming to those of the spaces defined between the opposite ends 61 and 62 of the first elastic means 6. That is, the second elastic means 63 and 64 have a half-moon shape. Thus, the second elastic means 63 and 64 serve to minimize fatigue occurring at the first elastic means 6, thereby extending the life of the first elastic means 6.

Although the first elastic means comprises a plate spring having an S-shaped cross section in the illustrated case, it may alternatively comprise a C-shaped plate spring, a compression coil spring, a urethane-based elastic member having a trapezoidal cross section or any other shape known to one having ordinary skill in the art. These will be described in conjunction with FIGS. 15a to FIGS. 26b.

The second cover 8, which is assembled in such a fashion that it is arranged at the outermost portion of the hinge housing 1, is made of a metal material exhibiting an elasticity. As mentioned above, the second cover 8 is formed with locking protrusions 81 and 82 at portions thereof near opposite free ends thereof, respectively. The locking protrusions 81 and 82 are engaged with the locking holes 223 and 233 of the first cover 2, respectively, thereby fixing the second cover 8 to first cover 2.

Once the locking protrusions provided at the hinge housing 1 and second cover 8 made of a metal material are engaged with the associated locking holes formed through the first cover 2 in an assembling direction as indicated by the arrow in FIG. 2, they are prevented from being separated from those locking holes in a direction opposite to the assembling direction. That is, the first and second cover 2 and 8 are fixed to the hinge housing 1 by the engagement between the locking protrusions and the associated locking holes.

Now, the procedure for assembling together the constituting elements of the above hinge assembly will be described. First, the hinge shaft 3a mounted with the hinge cam 4a is assembled to the first cover 2. The first plate spring 5 and first cover 2 are then assembled to the hinge housing 1. Thereafter, the first elastic means 6, to which the second elastic means 63 and 64, and the guide member 7 are assembled, is inserted into a space defined by the hinge housing 1 and first cover 2. Finally, the second cover 8 is coupled to the first cover 2.

Referring to FIG. 3, the hinge assembly is shown in a state in which the above mentioned elements are completely assembled together. The completely assembled hinge assembly has a rectangular parallelepiped structure in a state in which the coupling member 31a of the hinge shaft 3a is exposed outside of the structure. FIG. 4 illustrates the procedure for assembling the completely assembled hinge assembly in an associated mounting part of the phone body. The mounted state of the hinge assembly to the phone body is illustrated in FIG. 5.

As shown in FIGS. 3 to 5, the two hinge assemblies are individually assembled and mounted in the associated mounting parts 1010 of the phone body 1000. The mounting parts 1010 of the phone body 1000 respectively defined at opposite sides of the LCD module 1002 have a size corresponding to an associated one of the hinge assemblies. A mounting hole 1011 is formed at each mounting part 1010 of the phone body 1000. The mounting hole 1011 has a circular shape and is adapted to expose the coupling member 31a of the hinge shaft 3a outside the phone body 100. Accordingly, the hinge assembly H1 can be assembled in the mounting part 1010 of the phone body 1000 by downwardly depressing the hinge assembly H1 in the mounting part 1010 of the phone body 1000 under the condition in which the coupling member 31a of the hinge shaft 3a extends through the mounting hole 1011. Thus, the assembling of the hinge assembly H1 is very simply achieved.

After the hinge assembly H1 is completely assembled in the mounting part 1010 of the phone body 1000, the hinge housing 1 thereof is hidden by the mounting part 1010 while outwardly exposing the coupling member 31a of the hinge shaft 3a.

Figure 6A:
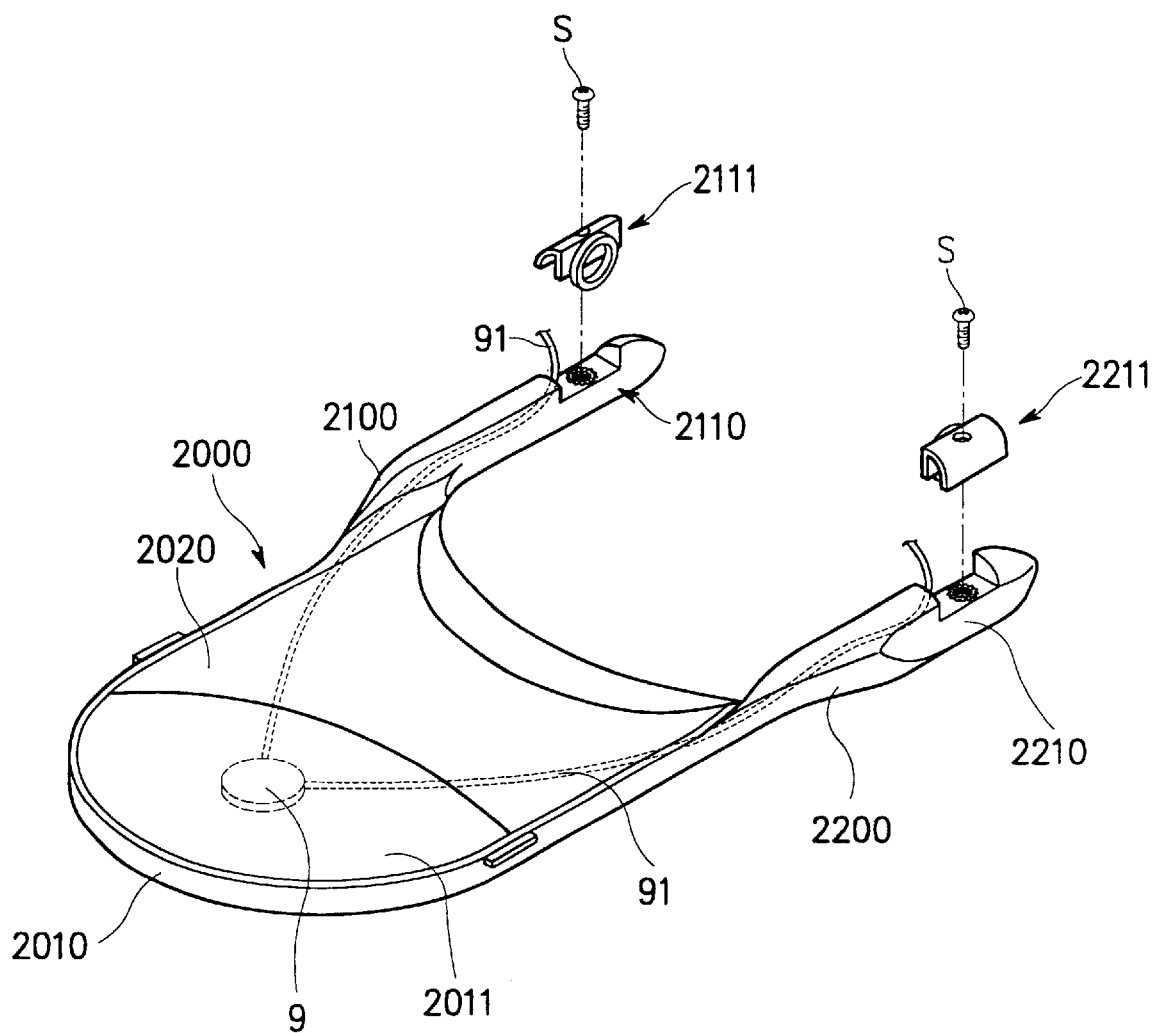
FIG. 6a is an exploded perspective view illustrating a procedure for coupling flip dummy members to a flip cover according to a preferred embodiment of the present invention.
Figure 6B:
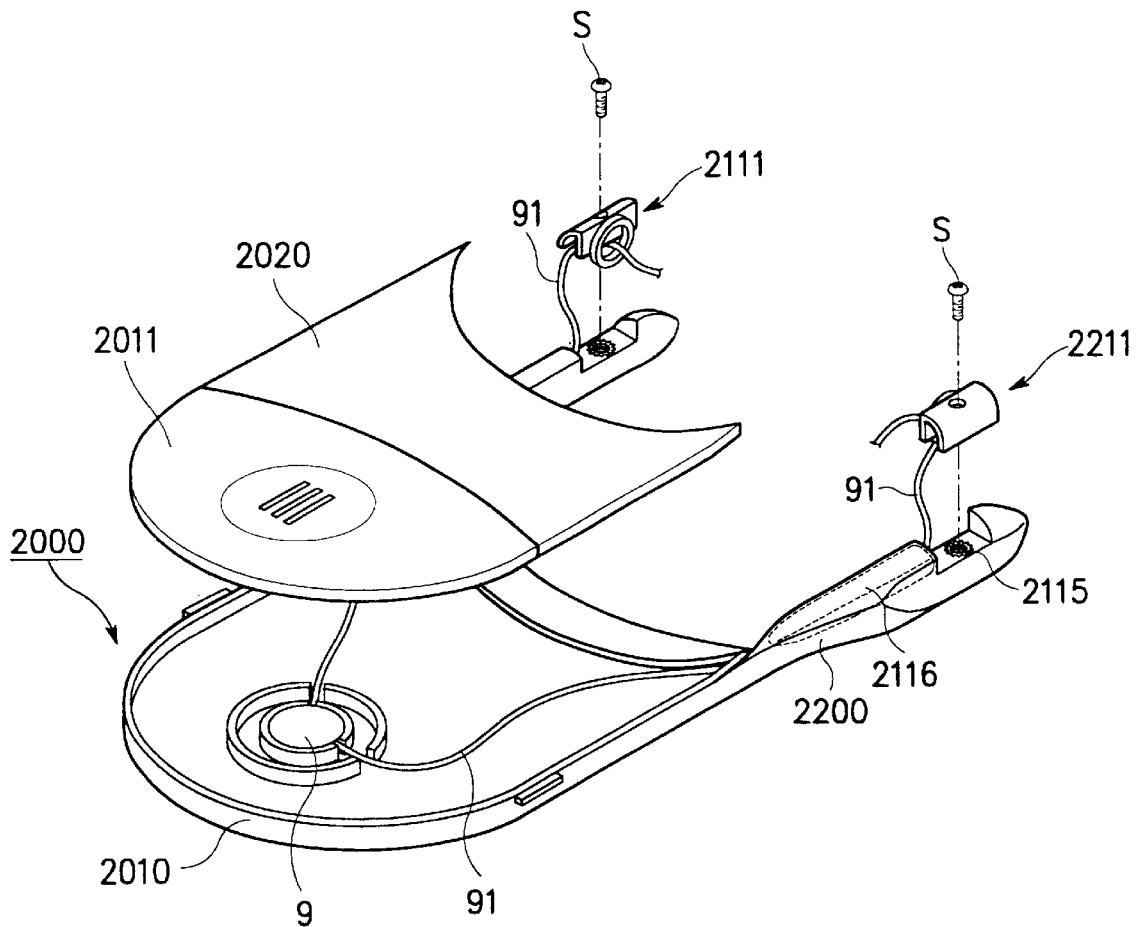

FIG. 6a is an exploded perspective view illustrating a procedure for coupling the flip dummy members to the flip cover in accordance with a preferred embodiment of the present invention. FIG. 6b is an exploded perspective view illustrating the configuration of the flip cover shown in FIG. 6a. In addition, FIG. 7 is an exploded perspective view illustrating a procedure for coupling the flip cover with the hinge assemblies.

As shown in FIGS. 6a and 6b, the flip cover 2000 according to the present invention includes an outer case 2010 and an inner case 2020 assembled together while defining a space for containing the speaker 9 therebetween. The inner case 2020 is provided at its lower portion with an ear piece portion coming into contact with the ear of the user. The speaker 9 is arranged at the ear piece portion. In the illustrated case, this ear piece portion of the inner case 2020 is constituted by an ear piece 2011 formed independently of the inner case 2020 and attached at its inner surface with the speaker 9. The ear piece 2011 is made of a specific material independent of the other portion of the inner case 2020. Preferably, this ear piece 2011 is made of an elastomeric material exhibiting a superior touch. Where the ear piece 2011 is made of such an elastomeric material, the user experiences a soft and pleasant feeling from the ear piece 2011 coming into contact with his ear.

The necks 2100 and 2200 extend longitudinally in a symmetrical manner from the upper end of the outer case 2010 at opposite lateral ends of the outer case 2010, respectively. Knuckles 2110 and 2210 are formed at respective ends of necks 2100 and 2200 so as to couple the outer case 2010 with the hinge assemblies mounted in the phone body. The knuckles 2110 and 2210 are coupled to the hinge assemblies by means of flip dummy members 2111 and 2211, and set screws S, respectively. Each set screw S extends vertically through holes vertically aligned and formed through the associated flip dummy member, coupling member, and knuckle.

Figure 7:
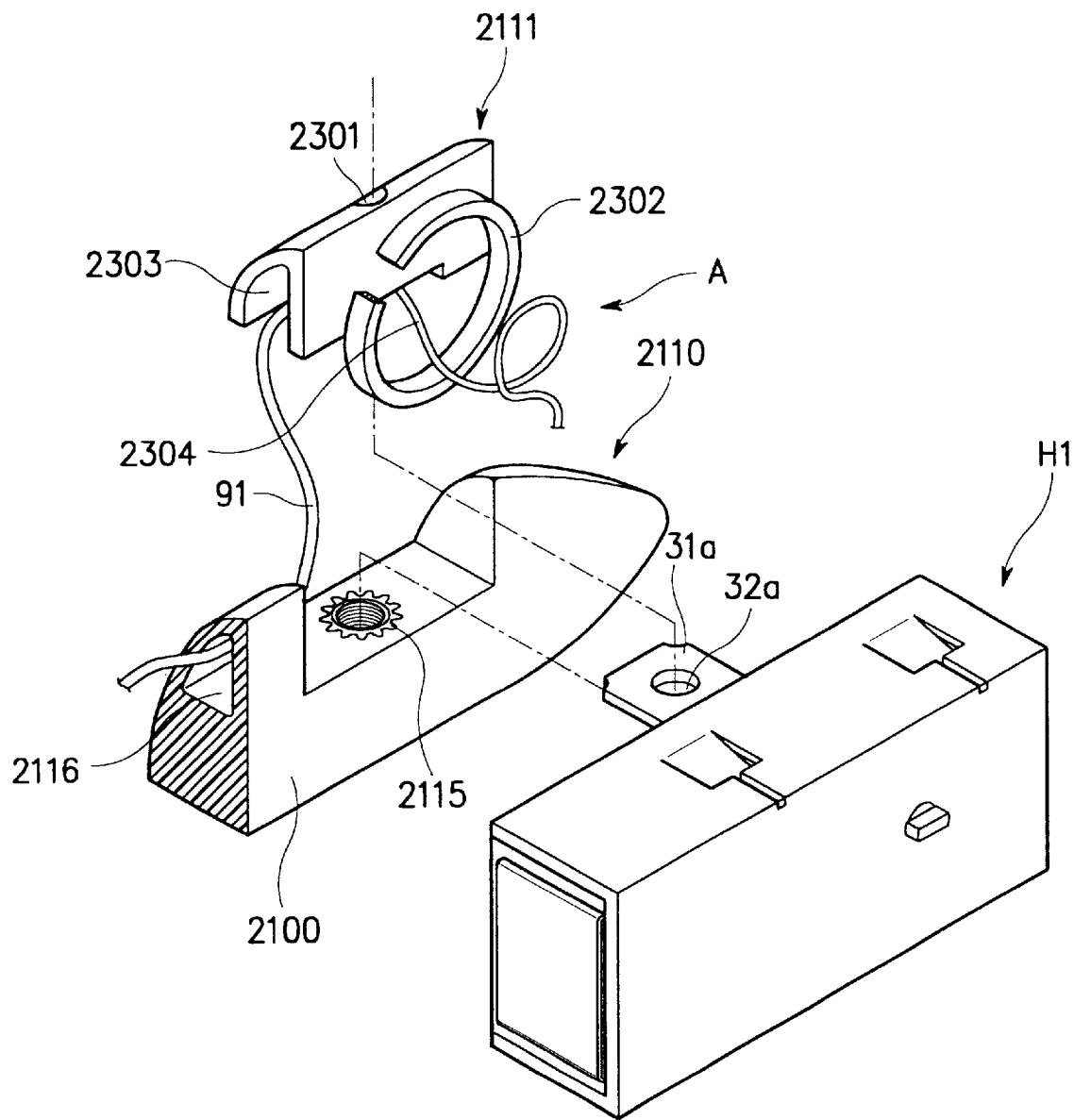
FIG. 7 is an exploded perspective view illustrating a procedure for coupling the flip cover with the hinge assemblies.

As shown in FIG. 7, a threaded insert 2115 is fitted in a hole formed in the surface of each of the knuckles 2110 and 2210 on which an associated one of the flip dummy members 2111 and 2211 is laid. Each of the flip dummy members 2111 and 2211 also has a vertical through hole 2301.

Accordingly, the coupling of each knuckle to the associated hinge assembly is achieved by arranging the knuckle beneath the coupling member 31a of the hinge assembly in such a fashion that its insert 2115 is vertically aligned with a hole 32a formed through the coupling member 31a, inserting the flip dummy member 2111 into the knuckle in such a fashion that its through hole 2301 is vertically aligned with the hole 32a and insert 2115, inserting the set screw S into the vertically aligned holes, and fastening the set screw S to the insert 2115.

Thus, the flip cover 2000 is coupled with the hinge assemblies H1. In this state, the flip dummy members 2111 serve to provide a more firm coupling between the flip cover 2000 and the hinge assemblies.

Each flip dummy member 2111 also has a ring-shaped insert portion 2302 adapted to be fitted in the mounting hole 1011 of the phone body 1000 when the flip dummy member 2111 is coupled to the associated hinge assembly. The flip dummy member 2111 is also provided at one lateral end thereof with an inlet wire hole 2303 communicating with the interior of the flip dummy member 2111. An outlet wire hole 2304 is also formed through the bottom portion of the flip dummy member 2111.

The wire hole 2303 of each flip dummy member 2111 also communicates with a wire passage 2116 extending longitudinally through an associated one of the necks 2100 and 2200 under the condition in which the flip dummy member 2111 is coupled to the associated neck.

Upon coupling, each set screw S is vertically inserted into the through hole 2301 of the associated flip dummy member 2111 and the coupling hole 31a of the associated hinge assembly, and then tightly fastened to the insert 2115. Accordingly, a vertical clamping force is applied to both the knuckle and flip dummy member associated with each neck by the set screw S, the flip cover 2000 is firmly coupled to the hinge assemblies. Wires 91 from the speaker 9 mounted in the flip cover 2000 extend through the wire passages 2116 of the necks 2100 and 2200, and then through the wire holes 2303 and 2304 of the flip dummy members 2111 to the interior of the phone body 1000, respectively.

The wire passages 2116 of the flip cover 2000 are formed using a gas injection process. That is, a gas injection port and a gas discharge port are first formed at opposite ends of each neck of the flip cover, respectively . Thereafter, gas is injected into the gas injection port in such a fashion that it is discharged from the gas discharge port while passing longitudinally through the neck, in accordance with the gas injection process. Thus, a wire passage is formed through the neck. After the formation of the wire passage, the gas injection port and gas discharge port are cut from the neck. In the drawings, the flip cover is shown in a state in which the gas injection port and gas discharge port are cut therefrom.

When the flip cover 2000 is coupled with the hinge assemblies mounted in the phone body 1000, each wire 91 is wound at least one turn around the associated hinge shaft 3a after emerging from the wire hole 2304 formed through the bottom of the associated flip dummy member 2111, and then connected to a printed circuit board (not shown) mounted in the phone body 1000. The winding of the wire 91 is shown by the character "A" in FIG. 7. The reason why the wire 91 is wound at least one turn is to minimize an interference of the wire 91 with a pivotal movement of the flip cover 2000 with respect to the phone body 1000. That is, this is intended to prevent the wire 91 from interfering with the pivoting force of the flip cover 2000.

Figure 8:
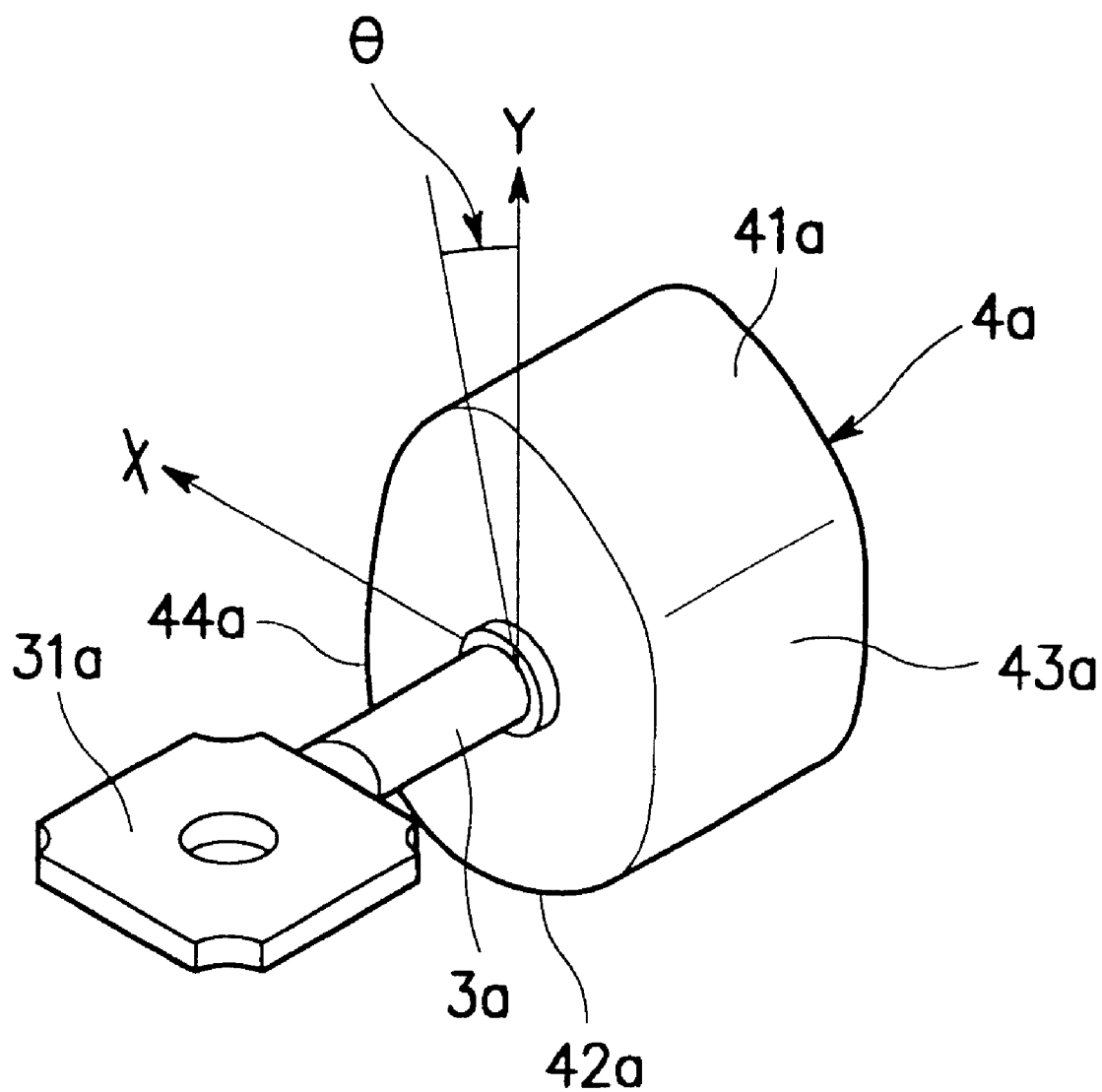
FIG. 8 is a perspective view illustrating a hinge cam according to a preferred embodiment of the present invention.

FIG. 8 is a perspective view illustrating the hinge shaft mounted with the hinge cam which is a constituting element of each hinge assembly according to a preferred embodiment of the present invention.

Practically, two hinge assemblies H1 and H2 according to the present invention are mounted in the mounting parts of the phone body 1000 in a symmetrical manner, respectively.

As shown in FIG. 8 and mentioned above, the hinge cam 4a of each hinge assembly has a pair of opposite curved surfaces 41a and 42a, and a pair of opposite flat surfaces 43a and 44a. One of the curved surfaces, namely, the curved surface 41a, is formed to have an inflection point (namely, a point where the curved surface 41a has a minimum radius of curvature) at a position where it is spaced by an angle of "θ" in an opening direction of the flip cover 2000 from the Y-axis of an X-Y coordinate having an origin corresponding to the axis of the hinge shaft 3a. The X-Y coordinate is defined when the hinge cam 4a is positioned in a state in which its flat surfaces 43a and 44a extend vertically.

The reason why the inflection point of the curved surface 41a is spaced by the angle of "θ" in an opening direction of the flip cover 2000 from the Y-axis of the X-Y coordinate is to prevent the flip cover 2000 from being stopped at a certain angular position during its opening and closing movements.

It is preferred in terms of the operability of the flip cover that the angle of "θ" be about 10°. This will be described in detail hereinafter.

Figure 9:
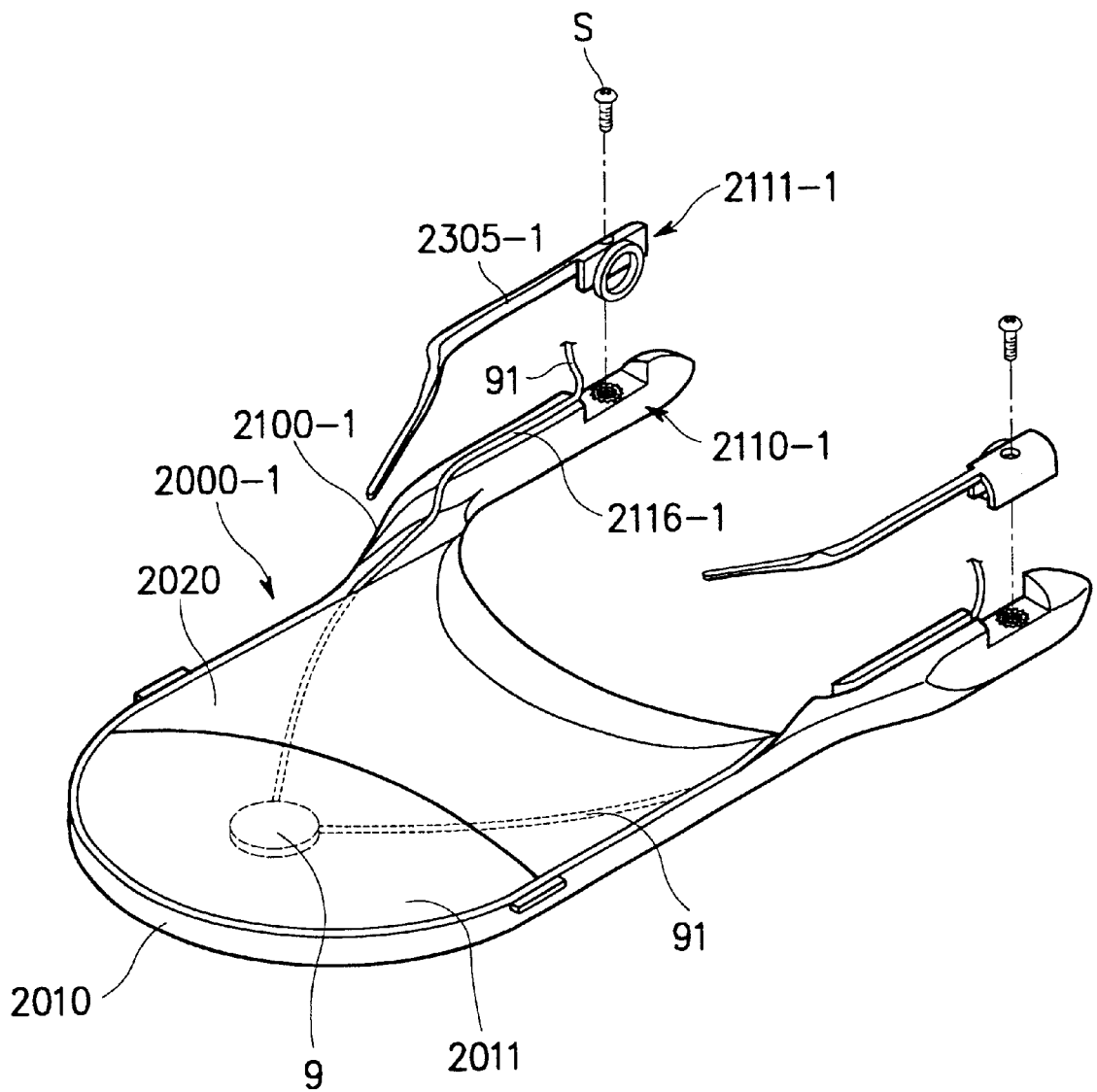
FIG. 9 is an exploded perspective view illustrating a procedure for coupling flip dummy members to a flip cover according to another embodiment of the present invention.
Figure 10:
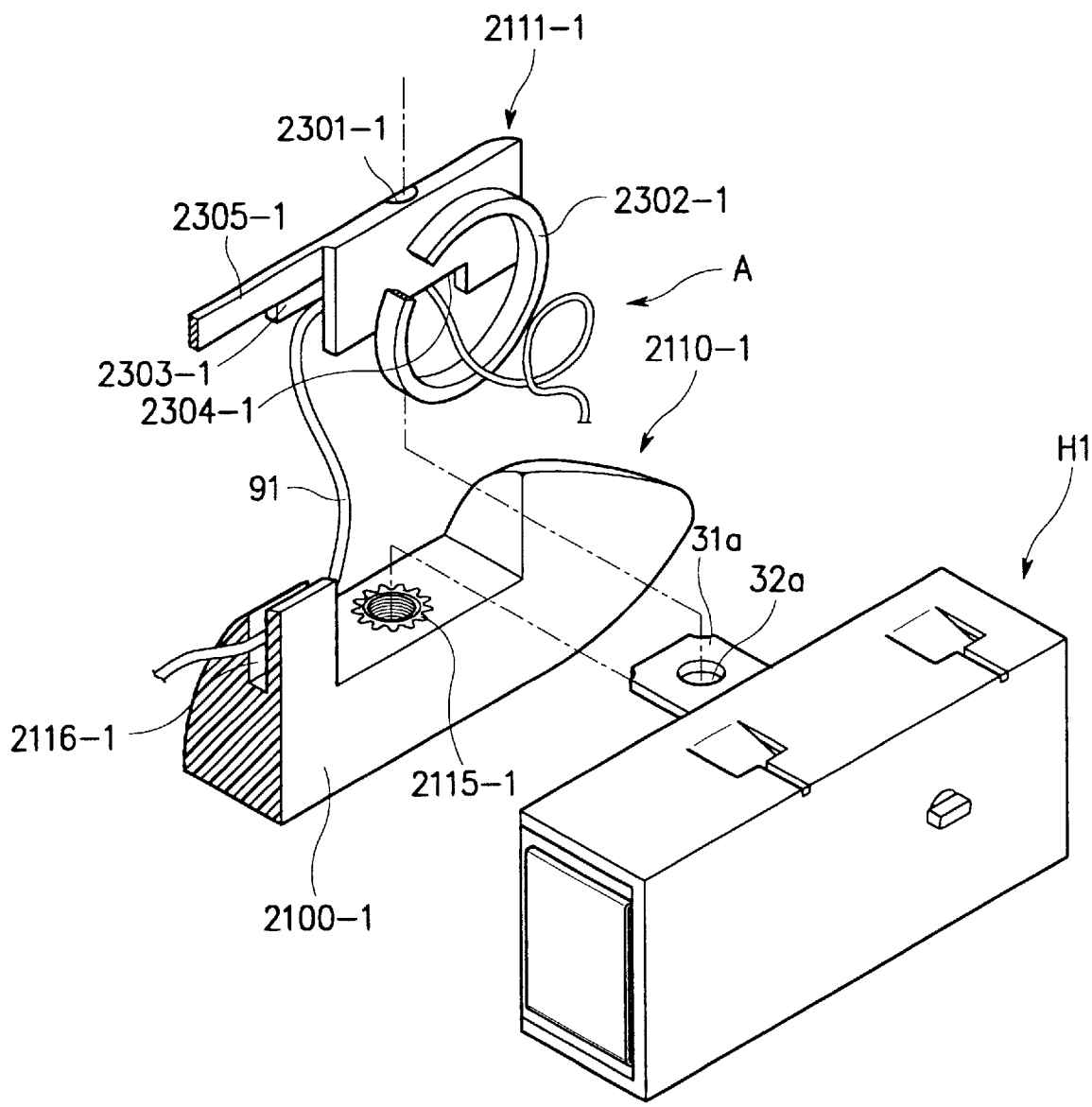
FIG. 10 is an exploded perspective view illustrating a procedure for coupling the flip cover with the hinge assemblies in accordance with the embodiment of the present invention shown in FIG. 9.

Referring to FIGS. 9 and 10, another embodiment of the flip cover 2000 is illustrated. This embodiment is different from the embodiment shown in FIGS. 6a and 6b in terms of the configurations of the necks and flip dummy members associated with the connection of the speaker.

As shown in FIG. 9, the speaker 9 is installed in the flip cover 2000 in order to provide a more compact flip-down or up type portable phone structure. That is, the flip cover 2000 of this embodiment includes an outer case 2010 and an inner case 2020 assembled together while defining a space for containing the speaker 9 therebetween. This configuration is the same as that of the embodiment of FIG. 6a. In accordance with this embodiment, a pair of necks 2100-1 extend longitudinally from the upper end of the outer case 2010 at opposite lateral ends of the outer case 2010, respectively. A guide groove 2116-1 is formed on the inner surface of each neck 2100-1 along the length of the neck 2100-1. Wires 91, which extend from the speaker 9 to connect the speaker 9 to the printed circuit board of the phone body 1000, are received in the guide grooves 2116-1 in such a fashion that they extend along the guide grooves 2116-1, respectively. Knuckles 2110-1, which have the same configuration as the knuckles 2110 and 2210, are formed at respective ends of necks 2100 and 2200. The flip cover 2000 of this embodiment also has a pair of flip dummy members 2111-1 each having an extension 2305-1 as a fitting member adapted to be fitted in the guide groove 2116-1 of the associated neck 2100-1, thereby hiding the wire 91 received in the associated guide groove 2116-1. The extension 2305-1 has a shape conforming to that of the associated guide groove 2116-1. The free end of the extension 2305-1 is hidden between the assembled outer and inner cases 2010 and 2020 of the flip cover 2000.

In order to receive the wire 91 emerging from the associated neck 2100-1, each flip dummy member 2111 -1 is provided at one lateral end thereof with a wire hole 2303-1 communicating with the interior of the flip dummy member 2111 -1. Another wire hole 2304-1 is also formed through the bottom portion of the flip dummy member 2111-1. Accordingly, the wire 91 from the speaker extends through the guide groove 2116-1 and then extends to the phone body 1000 via the wire holes 2303-1 and 2304-1.

The extension 2305-1 of each flip dummy member 2111-1 is fitted in the associated guide groove 2116-1 under the condition in which the associated wire 91 has been received in the guide groove 2116-1. In the state in which the extension 2305-1 is fitted in the guide groove 2116-1, a wire retaining passage is defined in the guide groove 2116-1. The extension 2305-1 is integral with the body of the flip dummy member 2111-1 at one end thereof. The other end, namely, free end, of the extension 2305-1 is firmly interposed between the outer and inner cases 2010 and 2020.

By such a configuration, each wire 91 from the speaker 9 installed in the flip cover 2000 passes the guide groove 2116-1 of the associated neck 2100-1, the through holes 2303-1 and 2304-1 of the associated flip dummy member 2111-1, and then the associated mounting hole 1011 of the phone body 1000, so that it is electrically connected to the printed circuit board mounted in the phone body 1000 by means of soldering. Thus, the speaker 9 is electrically connected to the printed circuit board.

When the flip cover 2000 is coupled with the hinge assemblies mounted in the phone body 1000, each wire 91 is wound at least one turn around the associated hinge shaft 3a after emerging from the wire hole 2304-1 formed through the bottom of the associated flip dummy member 2111-1, and then connected to the printed circuit board mounted in the phone body 1000. The winding of the wire 91 is shown by the character "A" in FIG. 10. As mentioned in conjunction with the previous embodiment, the reason why the wire 91 is wound at least one turn is to minimize an interference of the wire 91 with a pivotal movement of the flip cover 2000 with respect to the phone body 1000. That is, this is intended to prevent the wire 91 from interfering with the pivoting force of the flip cover 2000.

FIGS. 11a, 12a, 13a, and 14a are cross-sectional views taken in a direction indicated by the arrow "A" in FIG. 1 and illustrate an operation of one hinge assembly H1, respectively. On the other hand, FIGS. 11b, 12b, 13b, and 14b are cross-sectional views taken in a direction indicated by the arrow "B" in FIG. 1 and illustrate an operation of the other hinge assembly H2, respectively.

The operations of the hinge mechanisms according to the present invention will now be described in conjunction with those figures. In the following description, the elements of the hinge assembly H2 designated by reference numerals suffixed with "a" in the above description will be designated by the same reference numerals, but suffixed with "b", in order to distinguish them from those of the hinge assembly H1.

Figure 11A:
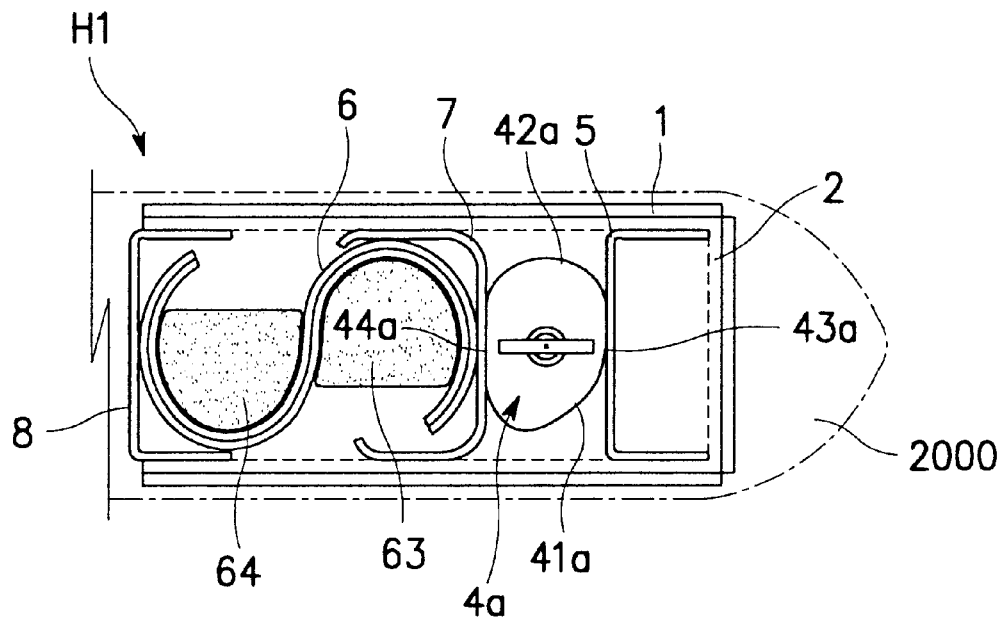
Figure 11B:
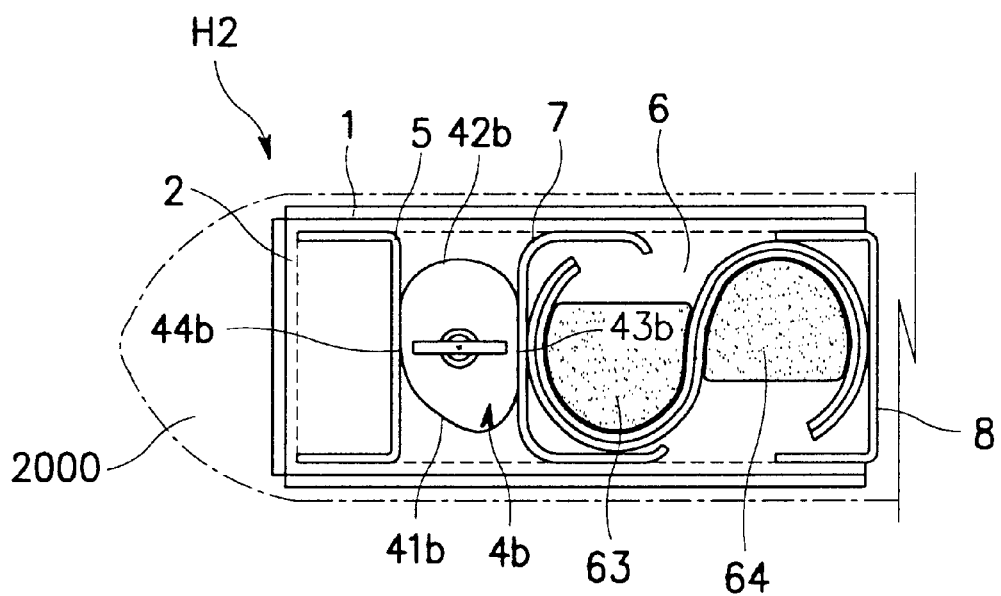

FIGS. 11a and 11b show a closed state of the flip cover 2000 on the phone body 1000.

As shown in FIG. 11a, where the flip cover 2000 is in its closed state on the phone body 1000, the hinge cam 4a of the hinge assembly H1 is positioned in such a fashion that its curved surfaces 41a and 42a face downwardly and upwardly, respectively, with its flat surfaces 43a and 44a extending vertically. In this state, the flat surfaces 43a and 44a are in surface contact with the plate spring 5 and the guide member 7 elastically supported by the first elastic means 6, respectively. Accordingly, the hinge cam 4a is biased by the plate spring 5 and first elastic means 6 at opposite sides thereof, respectively, so that the flat surfaces 43a and 44a are maintained in a state being in close contact with the plate spring 5 and guide member 7.

In this state, the second elastic means 63 and 64 additionally installed to the first elastic means 6 are in a state in which a minimum compression force is applied thereto.

On the other hand, in the case of the hinge assembly H2, the hinge cam 4b thereof is positioned in such a fashion that its curved surfaces 41b and 42b face downwardly and upwardly, respectively, with its flat surfaces 43b and 44b extending vertically, as shown in FIG. 11b. In this state, the flat surfaces 43b and 44b are in surface contact with the plate spring 5 and the guide member 7, respectively. Accordingly, the hinge cam 4b is biased by the plate spring 5 and first elastic means 6 at opposite sides thereof, respectively.

Since each of the hinge cams 4a and 4b is biased by the plate spring 5 and first elastic means 6 at opposite sides thereof, respectively, it is maintained in the above mentioned state, so that the flip cover 2000 is maintained in its closed state. That is, the flip cover 2000 cannot open by itself unless a certain opening force is applied thereto. In the closed state of the flip cover 2000, the first elastic means 6 is in a state in which it is stretched to the maximum. In this state, accordingly, the elastic force provided by the first elastic means 6 is minimum.

As a result, the second elastic means 63 and 64 installed between opposite ends of the first elastic means 6 are in a state in which a minimum biasing force is applied thereto.

Figure 12A:
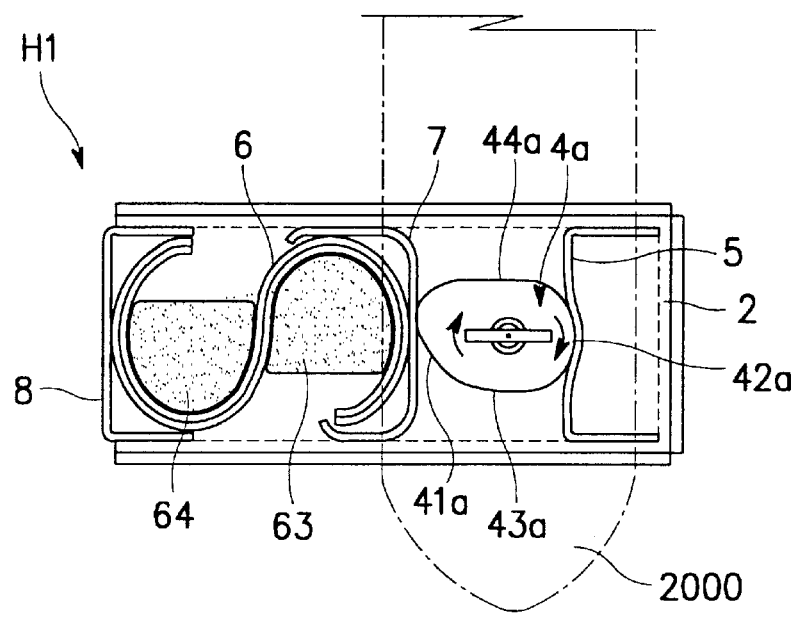
FIGS. 12a and 12b show respective operation states of the hinge assemblies when the flip cover is in an opened state corresponding to an opening angle of 90°.
Figure 12B:
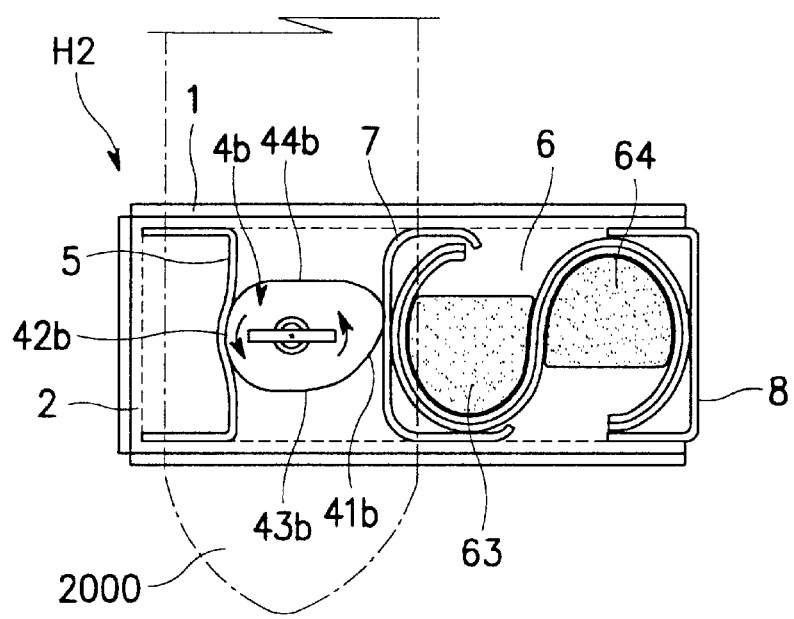

FIGS. 12a and 12b show respective operation states of the hinge assemblies H1 and H2 when the flip cover 2000 is in an opened state corresponding to an opening angle of 90°.

As shown in FIG. 12a, where the flip cover 2000 is opened with an opening angle of 90° to allow the portable phone to be used, the hinge cam 4a of the hinge assembly H1 is positioned in such a fashion that its curved surfaces 41a and 42a face horizontally in opposite directions, respectively, with its flat surfaces 43a and 44a extending horizontally. In this state, the curved surfaces 41a and 42a are closely in surface contact with the guide member 7 and plate spring 5, respectively. As mentioned above, the curved surfaces 41a and 42a are spaced from the axis of the hinge shaft 3a by distances greater than those of the flat surfaces 43a and 44a throughout all portions thereof, respectively. Accordingly, as the hinge cam 4a rotates from the closed position of the flip cover 2000 to a position corresponding to the opening angle of 90°, the curved surfaces 41a and 42a slide along the guide member 7 and plate spring 5 while being in close contact with the guide member 7 and plate spring 5, respectively.

During this rotation of the hinge cam 4a, therefore, the plate spring 5 is slightly depressed at its middle portion. The guide member 7 is also slightly retracted toward the second cover 8. As a result, the plate spring 5 and first elastic means 6 apply a maximum elastic force to the hinge cam 4a. When the hinge cam 4a is in a state rotated to the position corresponding to the opening angle of 90°, the inflection point of the curved surface 41a thereof is in a state already passed the guide member 7. This is because the inflection point of the curved surface 41a is formed at a position where it is spaced by a certain angle in an opening direction of the flip cover 2000 from the Y-axis of an X-Y coordinate defined when the hinge cam 4a is positioned in a state rotated by an opening angle of 90°. Under this condition, accordingly, the elastic forces applied to the hinge cam 4a by the first and second elastic means 6, 63 and 64 and the plate spring 5 at opposite sides of the hinge cam 4a serve to further rotate the hinge cam 4a in a direction in which the flip cover 2000 is opened. Therefore, the flip cover 2000 tends to be automatically opened even when there is no external force applied thereto. At this time, the first elastic means 6 is in a state in which it is compressed to the maximum. The second elastic means 63 and 64, which are interposed between opposite ends of the first elastic means 6, are also in a state, in which they are compressed to the maximum, because they receive the maximum elastic force of the first elastic means 6.

As shown in FIG. 12b, where the flip cover 2000 is opened with an opening angle of 90°, the hinge cam 4b of the hinge assembly H2 is positioned in such a fashion that its curved surfaces 41b and 42b face horizontally in opposite directions, respectively, with its flat surfaces 43b and 44b extending horizontally. In this state, the curved surfaces 41b and 42b are closely in surface contact with the guide member 7 and plate spring 5, respectively. As mentioned above, the curved surfaces 41b and 42b are spaced from the axis of the hinge shaft 3a by distances greater than those of the flat surfaces 43b and 44b throughout all portions thereof, respectively. Accordingly, as the hinge cam 4b rotates from the closed position of the flip cover 2000 to a position corresponding to the opening angle of 90°, the curved surfaces 41b and 42b slide along the guide member 7 and plate spring 5 while being in close contact with the guide member 7 and plate spring 5, respectively.

During this rotation of the hinge cam 4b, therefore, the plate spring 5 is slightly depressed at its middle portion. The guide member 7 is also slightly retracted toward the second cover 8. As a result, the plate spring 5 and first elastic means 6 apply a maximum elastic force to the hinge cam 4b. When the hinge cam 4b is in a state rotated to the position corresponding to the opening angle of 90°, the inflection point of the curved surface 41b thereof is in a state already passed the guide member 7. This is because the inflection point of the curved surface 41b is formed at a position where it is spaced by a certain angle in an opening direction of the flip cover 2000 from the Y-axis of an X-Y coordinate defined when the hinge cam 4b is positioned in a state rotated by an opening angle of 90°. Under this condition, accordingly, the elastic forces applied to the hinge cam 4b by the first and second elastic means 6, 63 and 64 and the plate spring 5 at opposite sides of the hinge cam 4b serve to further rotate the hinge cam 4b in a direction in which the flip cover 2000 is opened. Therefore, the flip cover 2000 tends to be automatically opened even when there is no external force applied thereto.

Thus, the flip cover 2000 is automatically opened by virtue of the elastic forces applied to the hinge cams 4a and 4b in an opening direction of the flip cover 2000 as indicated by the arrow in FIG. 12a or 12b.

Figure 13A:
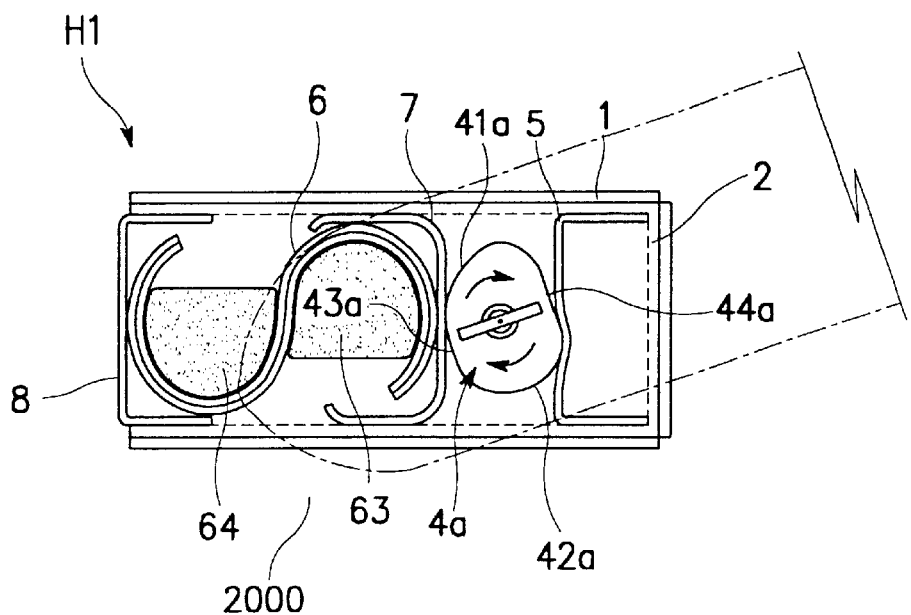
FIGS. 13a and 13b show respective operation states of the hinge assemblies when the flip cover is in an opened state corresponding to an opening angle of 160°.
Figure 13B:
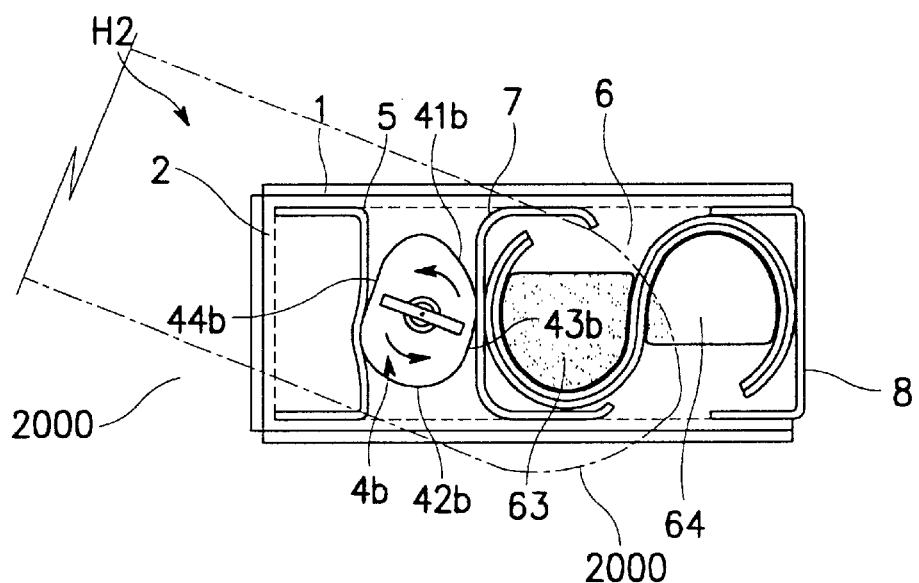

FIGS. 13a and 13b show respective operation states of the hinge assemblies H1 and H2 when the flip cover 2000 is in an opened state corresponding to an opening angle of 160°.

As shown in FIG. 13a, where the flip cover 2000 is opened with an opening angle of 160°, the hinge cam 4a of the hinge assembly H1 is positioned in such a fashion that its curved surfaces 41a and 42a are in close contact with the guide member 7 and plate spring 5 at their portions positioned near the flat surfaces 43a and 44a, respectively. Accordingly, the plate spring 5 and first elastic means 6 still apply elastic forces to the hinge cam 4a at opposite sides of the hinge cam 4a, respectively. Since the inflection point of the curved surface 41a has already passed the guide member 7 when the hinge cam 4a rotates by the opening angle of 90°, the elastic forces applied to the hinge cam 4a still serve to further rotate the hinge cam 4a in the opening direction of the flip cover 2000 indicated by the arrow of FIG. 13a, as in the case of FIG. 12a.

In the case of the hinge assembly H2, the hinge cam 4b thereof is positioned in such a fashion that its curved surfaces 41b and 42b are in close contact with the guide member 7 and plate spring 5 at their portions positioned near the flat surfaces 43b and 44b, respectively, as shown in FIG. 13b. Accordingly, the plate spring 5 and first elastic means 6 still apply elastic forces to the hinge cam 4b at opposite sides of the hinge cam 4b, respectively. Since the inflection point of the curved surface 41b has already passed the guide member 7 when the hinge cam 4b rotates by the opening angle of 90°, the elastic forces applied to the hinge cam 4b still serve to further rotate the hinge cam 4b in the opening direction of the flip cover 2000 indicated by the arrow of FIG. 13b, as in the case of FIG. 12b.

Thus, the flip cover 2000 is completely opened by virtue of the elastic forces applied to the hinge cams 4a and 4b in the opening direction of the flip cover 2000.

Figure 14A:
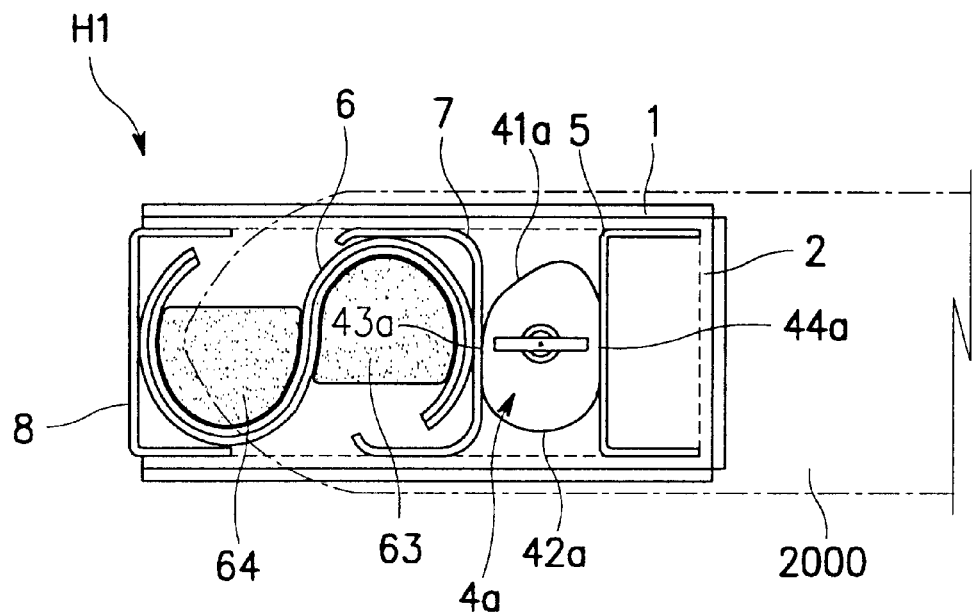
Figure 14B:
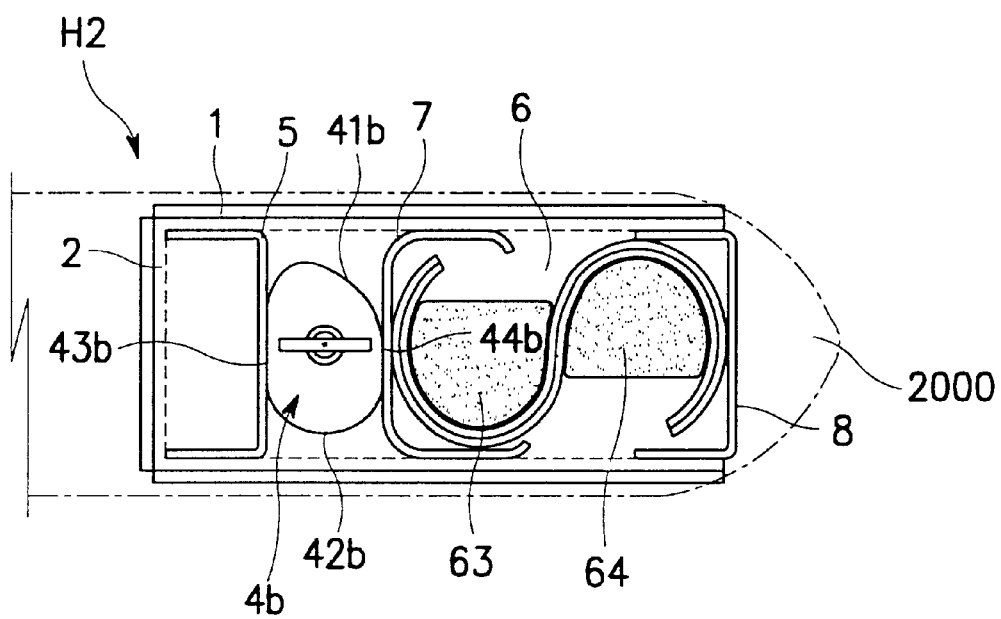

FIGS. 14a and 14b show respective operation states of the hinge assemblies H1 and H2 when the flip cover 2000 is in a completely opened state.

When the flip cover 2000 is opened in such a fashion that the curved surfaces 41a and 42a of the hinge cam 4a in the hinge assembly H1 complete their slide movements on the guide member 7 and plate spring 5, respectively, the hinge cam 4a is positioned in a state in which its flat surfaces 43a and 44a are in contact with the guide member 7 and plate spring 5, respectively, as shown in FIG. 14a. That is, the curved surfaces 41a and 42a face upwardly and downwardly, respectively, whereas the flat surfaces 43a and 44a extend vertically. In this state, no further rotation of the hinge cam 4a occurs unless an external rotating force is applied to the hinge cam 4a. In particular, the hinge cam 4a is maintained in this state because the plate spring 5 and first elastic means 6 apply their elastic forces to the hinge cam 4a at opposite sides of the hinge cam 4a, respectively. Practically, however, no further opening of the flip cover 2000 occurs even when an external rotating force is applied to the hinge cam 4a because the flip cover 2000 comes into contact with the antenna unit 1001 when it is further opened. By such a configuration, the opening angle of the flip cover 2000 is limited to about 1800.

In the case of the hinge assembly H2, the hinge cam 4b thereof is positioned in a state in which its flat surfaces 43b and 44b are in contact with the guide member 7 and plate spring 5, respectively, as shown in FIG. 14b. That is, the curved surfaces 41b and 42b face upwardly and downwardly, respectively, whereas the flat surfaces 43b and 44b extend vertically. In this state, no further rotation of the hinge cam 4b occurs unless an external rotating force is applied to the hinge cam 4b. In particular, the hinge cam 4b is maintained in this state because the plate spring 5 and first elastic means 6 apply their elastic forces to the hinge cam 4b at opposite sides of the hinge cam 4b, respectively. Practically, however, no further opening of the flip cover 2000 occurs even when an external rotating force is applied to the hinge cam 4b because the flip cover 2000 comes into contact with the anntena unit 1001 when it is further opened.

In this state, the second elastic means 63 and 64 interposed between opposite ends of the first elastic means 6 are in a state in which a minimum biasing force is applied thereto.

FIGS. 15a to 18b illustrate another embodiment of the present invention in which the first elastic means comprises a C-shaped plate spring.

As shown in FIGS. 15a to 18b, each hinge assembly according to this embodiment includes a C-shaped plate spring 6-1 as the first elastic means. The plate spring 6-1 has an arc shape having a convex middle portion. This plate spring 6-1 is supported by the guide member 7 and second cover 8 at their opposite ends 61-1 and 62-1, respectively. A single elastic member 63-1 made of a urethane material is also interposed between the guide member 7 and second cover 8 in such a fashion that it is surrounded by the plate spring 6-1, in order to prevent a fatigue phenomenon from occurring at the middle portion of the plate spring 6-1. Preferably, the plate spring 6-1 has a multi-ply structure having at least two plies in order to provide a strong elastic force. In the illustrated case, the plate spring 6-1 has a double-ply structure.

Figure 15A:
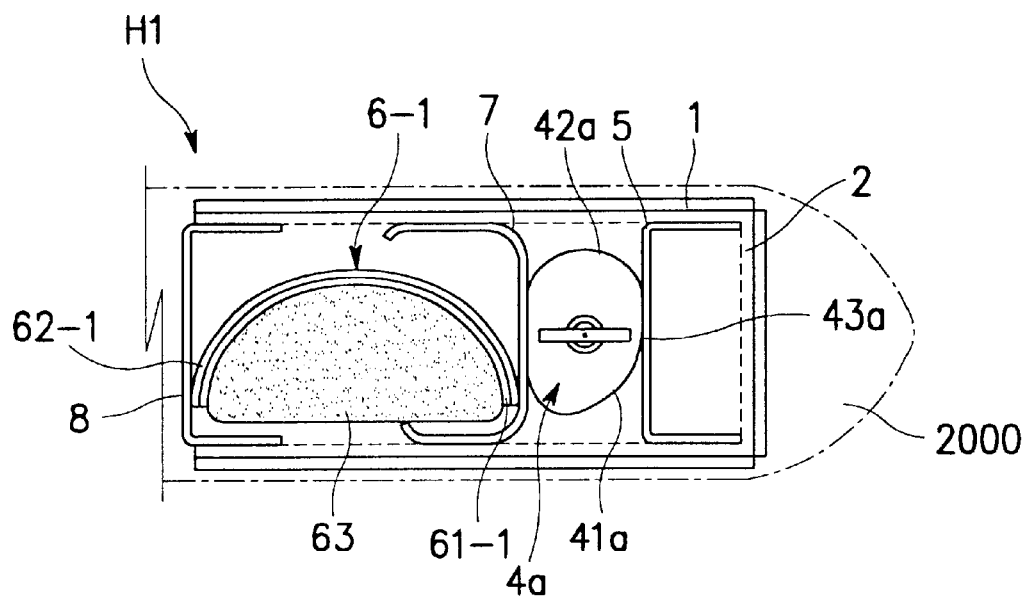
Figure 15B:
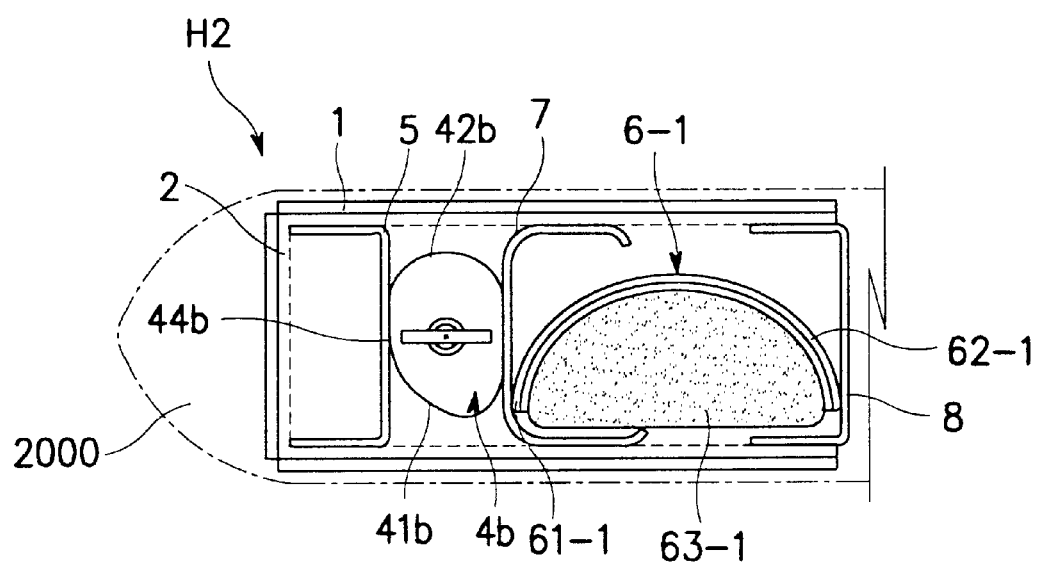

FIGS. 15a and 15b illustrate respective operation states of the hinge assemblies H1 and H2 in a closed state of the flip cover 2000 on the phone body 1000.

As shown in FIG. 1 Sa, where the flip cover 2000 is in its closed state on the phone body 1000, the hinge cam 4a of the hinge assembly H1 is positioned in such a fashion that its curved surfaces 41a and 42a face downwardly and upwardly, respectively, with its flat surfaces 43a and 44a extending vertically. In this state, the flat surfaces 43a and 44a are in surface contact with the plate spring 5 and the guide member 7 elastically supported by the first elastic means 6-1, respectively. Accordingly, the hinge cam 4a is biased by the plate spring 5 and first elastic means 6-1 at opposite sides thereof, respectively, so that the flat surfaces 43a and 44a are maintained in a state being in close contact with the plate spring 5 and guide member 7.

In this state, the urethane-based elastic member 63-1 additionally installed to the first elastic means 6-1 is in a state in which a minimum compression force is applied thereto.

On the other hand, in the case of the hinge assembly H2, the hinge cam 4b thereof is positioned in such a fashion that its curved surfaces 41b and 42b face downwardly and upwardly, respectively, with its flat surfaces 43b and 44b extending vertically, as shown in FIG. 15b. In this state, the flat surfaces 43b and 44b are in surface contact with the plate spring 5 and the guide member 7, respectively. Accordingly, the hinge cam 4b is biased by the plate spring 5 and first elastic means 6-1 at opposite sides thereof, respectively.

Since each of the hinge cams 4a and 4b is biased by the plate spring 5 and first elastic means 6-1 at opposite sides thereof, respectively, it is maintained in the above mentioned state, so that the flip cover 2000 is maintained in its closed state. That is, the flip cover 2000 cannot open by itself unless a certain opening force is applied thereto. In the closed state of the flip cover 2000, the first elastic means 6-1 is in a state in which it is stretched to the maximum. In this state, accordingly, the elastic force provided by the first elastic means 6-1 is minimum.

As a result, the elastic member 63-1 installed between opposite ends of the first elastic means 6-1 is in a state in which a minimum biasing force is applied thereto.

Figure 16A:
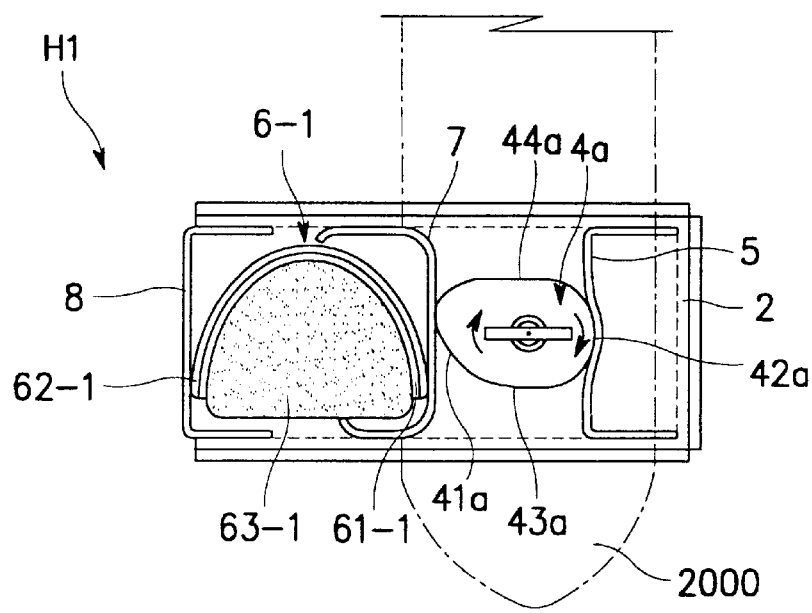
FIGS. 16a and 16b show respective operation states of the hinge assemblies when the flip cover is in an opened state corresponding to an opening angle of 90°.
Figure 16B:
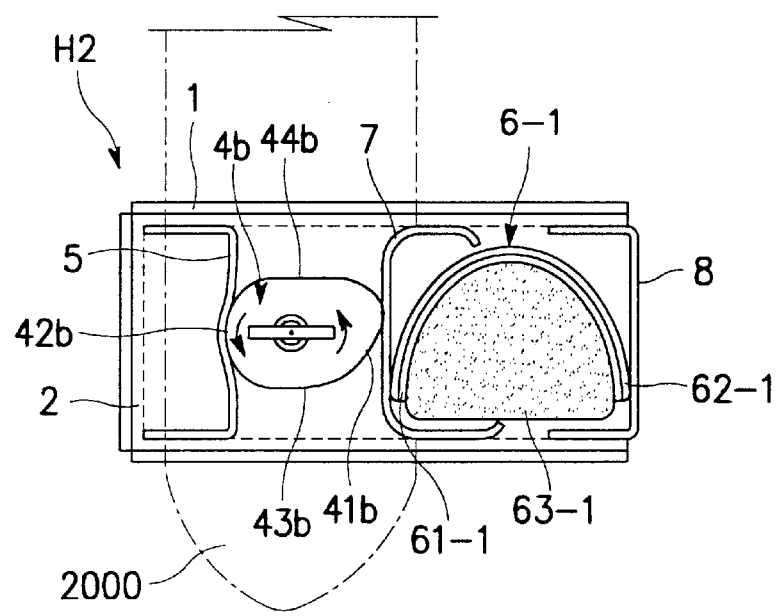

FIGS. 16a and 16b show respective operation states of the hinge assemblies H1 and H2 when the flip cover 2000 is in an opened state corresponding to an opening angle of 90°.

As shown in FIG. 16a, where the flip cover 2000 is opened with an opening angle of 90° to allow the portable phone to be used, the hinge cam 4a of the hinge assembly H1 is positioned in such a fashion that its curved surfaces 41a and 42a face horizontally in opposite directions, respectively, with its flat surfaces 43a and 44a extending horizontally. In this state, the curved surfaces 41a and 42a are closely in surface contact with the guide member 7 and plate spring 5, respectively. As mentioned above, the curved surfaces 41a and 42a are spaced from the axis of the hinge shaft 3a by distances greater than those of the flat surfaces 43a and 44a throughout all portions thereof, respectively. Accordingly, as the hinge cam 4a rotates from the closed position of the flip cover 2000 to a position corresponding to the opening angle of 90°, the curved surfaces 41a and 42a slide along the guide member 7 and plate spring 5 while being in close contact with the guide member 7 and plate spring 5, respectively.

During this rotation of the hinge cam 4a, therefore, the plate spring 5 is slightly depressed at its middle portion. The guide member 7 is also slightly retracted toward the second cover 8. As a result, the plate spring 5 and first elastic means 6-1 apply a maximum elastic force to the hinge cam 4a. When the hinge cam 4a is in a state rotated to the position corresponding to the opening angle of 90°, the inflection point of the curved surface 41a thereof is in a state already passed the guide member 7. This is because the inflection point of the curved surface 41a is formed at a position where it is spaced by a certain angle in an opening direction of the flip cover 2000 from the Y-axis of an X-Y coordinate defined when the hinge cam 4a is positioned in a state rotated by an opening angle of 90°. Under this condition, accordingly, the elastic forces applied to the hinge cam 4a by the first elastic means 6-1, the elastic member 63-1 and the plate spring 5 at opposite sides of the hinge cam 4a serve to further rotate the hinge cam 4a in an opening direction of the flip cover 2000. Therefore, the flip cover 2000 tends to be automatically opened even when there is no external force applied thereto. At this time, the first elastic means 6-1 is in a state in which it is compressed to the maximum. That is, the distance between the guide member 7 and second cover 8 is minimized.

The elastic member 63-1, which is interposed between the opposite ends 61-1 and 621 of the first elastic means 6-1, is also in a state, in which it is compressed to the maximum, because it receives the maximum elastic force of the first elastic means 6-1.

As shown in FIG. 16b, where the flip cover 2000 is opened with an opening angle of 90°, the hinge cam 4b of the hinge assembly H2 is positioned in such a fashion that its curved surfaces 41b and 42b face horizontally in opposite directions, respectively, with its flat surfaces 43b and 44b extending horizontally. In this state, the curved surfaces 41b and 42b are closely in surface contact with the guide member 7 and plate spring 5, respectively. As mentioned above, the curved surfaces 41b and 42b are spaced from the axis of the hinge shaft 3a by distances greater than those of the flat surfaces 43b and 44b throughout all portions thereof, respectively. Accordingly, as the hinge cam 4b rotates from the closed position of the flip cover 2000 to a position corresponding to the opening angle of 90°, the curved surfaces 411b and 42b slide along the guide member 7 and plate spring 5 while being in close contact with the guide member 7 and plate spring 5, respectively. At this time, the first elastic means 6-1 is in a state in which it is compressed to the maximum. Accordingly, the elastic member 63-1, which is interposed between the opposite ends 61-1 and 62-1 of the first elastic means 6-1, is also in a state, in which it is compressed to the maximum.

During this rotation of the hinge cam 4b, therefore, the plate spring 5 is slightly depressed at its middle portion. The guide member 7 is also slightly retracted toward the second cover 8. As a result, the plate spring 5 and first elastic means 6-1 apply a maximum elastic force to the hinge cam 4b. When the hinge cam 4b is in a state rotated to the position corresponding to the opening angle of 90°, the inflection point of the curved surface 41b thereof is in a state already passed the guide member 7. This is because the inflection point of the curved surface 41b is formed at a position where it is spaced by a certain angle in an opening direction of the flip cover 2000 from the Y-axis of an X-Y coordinate defined when the hinge cam 4b is positioned in a state rotated by an opening angle of 90°. Under this condition, accordingly, the elastic forces applied to the hinge cam 4b by the first elastic means 6-1, the elastic member 63-1 and the plate spring 5 at opposite sides of the hinge cam 4b serve to further rotate the hinge cam 4b in a direction in which the flip cover 2000 is opened. Therefore, the flip cover 2000 tends to be automatically opened even when there is no external force applied thereto.

Thus, the flip cover 2000 is automatically opened by virtue of the elastic forces applied to the hinge cams 4a and 4b in an opening direction of the flip cover 2000 as indicated by the arrow in FIG. 16a or 16b.

Figure 17A:
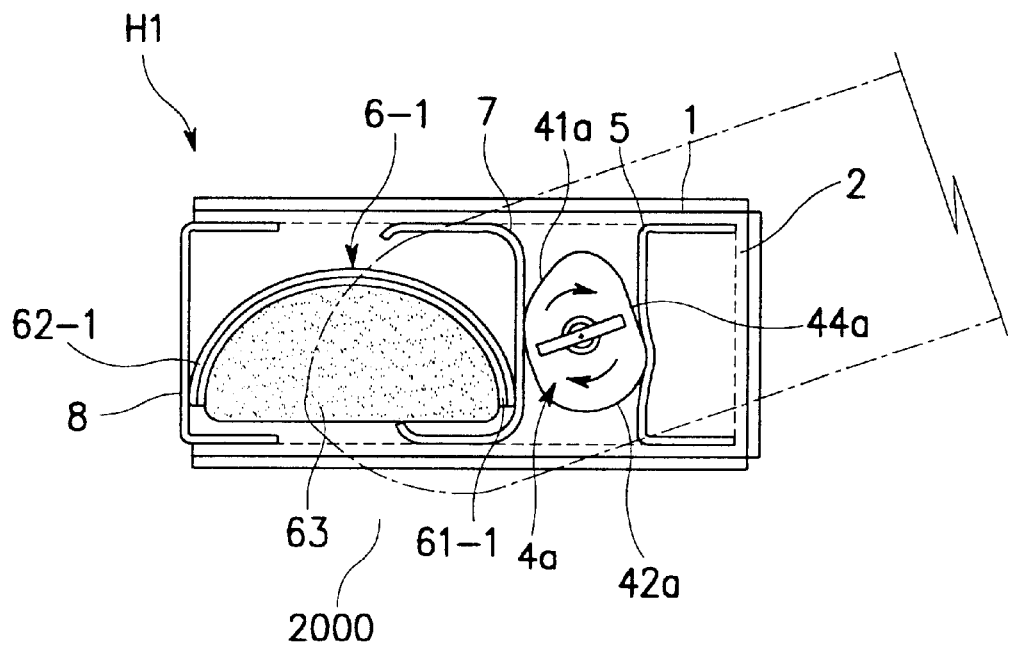
FIGS. 17a and 17b show respective operation states of the hinge assemblies when the flip cover is in an opened state corresponding to an opening angle of 160°.
Figure 17B:
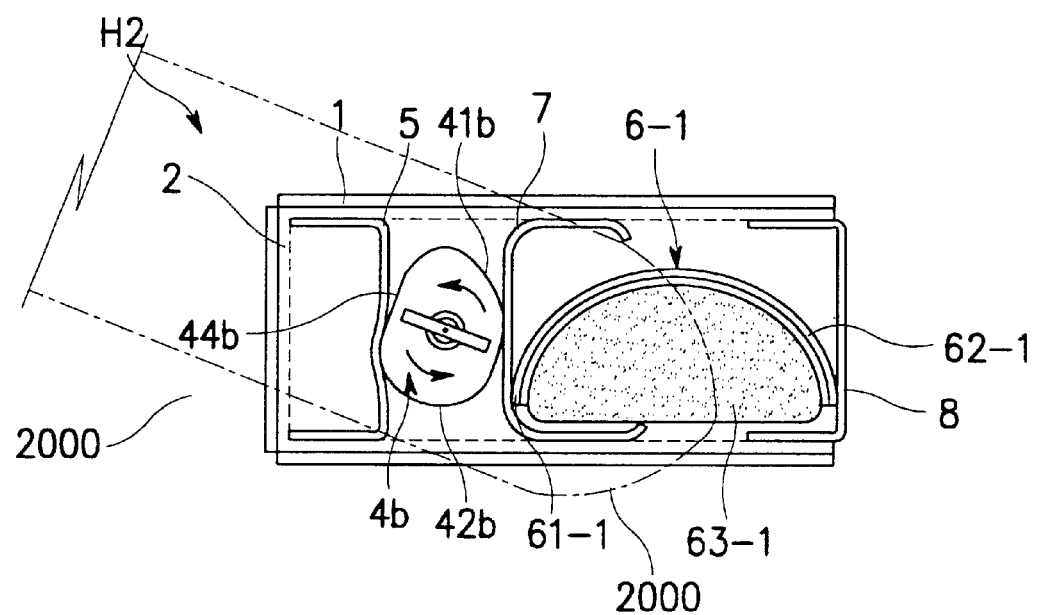

FIGS. 17a and 17b show respective operation states of the hinge assemblies H1 and H2 when the flip cover 2000 is in an opened state corresponding to an opening angle of 160°.

As shown in FIG. 17a, where the flip cover 2000 is opened with an opening angle of 160°, the hinge cam 4a of the hinge assembly H1 is positioned in such a fashion that its curved surfaces 41a and 42a are in close contact with the guide member 7 and plate spring 5 at their portions positioned near the flat surfaces 43a and 44a, respectively.

Accordingly, the plate spring 5 and first elastic means 6-1 still apply elastic forces to the hinge cam 4a at opposite sides of the hinge cam 4a, respectively. Since the inflection point of the curved surface 41a has already passed the guide member 7 when the hinge cam 4a rotates by the opening angle of 90°, the elastic forces applied to the hinge cam 4a still serve to further rotate the hinge cam 4a in the opening direction of the flip cover 2000 indicated by the arrow of FIG. 17a, as in the case of FIG. 16a.

In the case of the hinge assembly H2, the hinge cam 4b thereof is positioned in such a fashion that its curved surfaces 41b and 42b are in close contact with the guide member 7 and plate spring 5 at their portions positioned near the flat surfaces 43b and 44b, respectively, as shown in FIG. 17b. Accordingly, the plate spring 5 and first elastic means 6-1 still apply elastic forces to the hinge cam 4b at opposite sides of the hinge cam 4b, respectively. Since the inflection point of the curved surface 41b has already passed the guide member 7 when the hinge cam 4b rotates by the opening angle of 90°, the elastic forces applied to the hinge cam 4b still serve to further rotate the hinge cam 4b in the opening direction of the flip cover 2000 indicated by the arrow of FIG. 17b, as in the case of FIG. 16b.

Thus, the flip cover 2000 is completely opened by virtue of the elastic forces applied to the hinge cams 4a and 4b in the opening direction of the flip cover 2000.

Figure 18A:
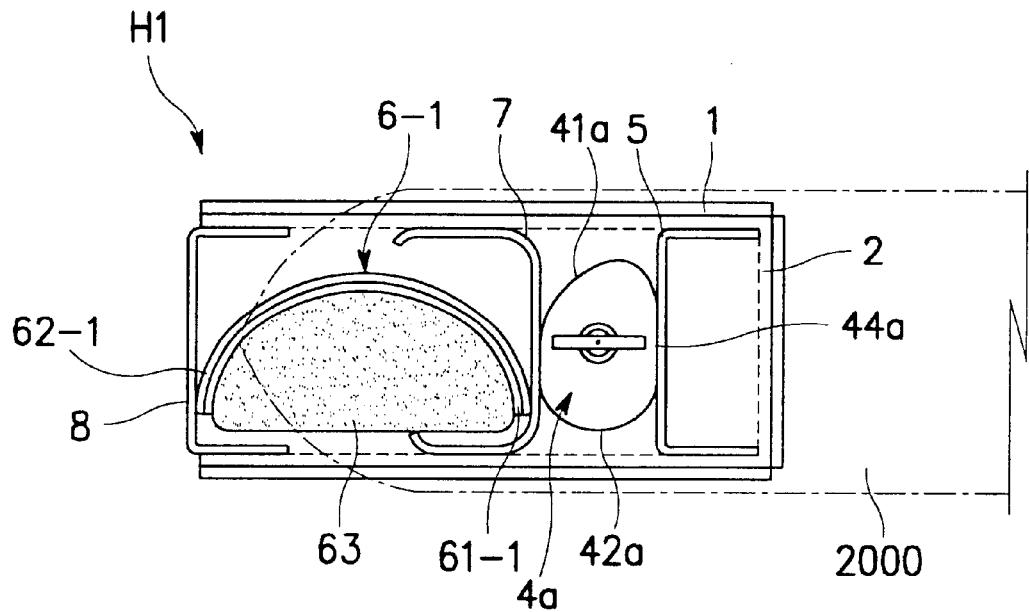
Figure 18B:
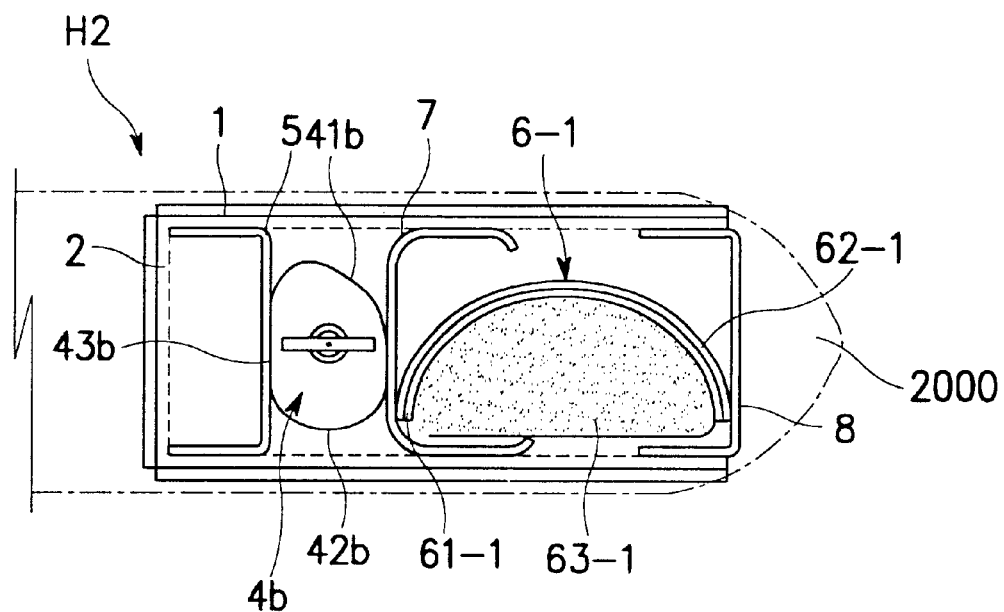

FIGS. 18a and 18b show respective operation states of the hinge assemblies H1 and H2 when the flip cover 2000 is in a completely opened state.

When the flip cover 2000 is opened in such a fashion that the curved surfaces 41a and 42a of the hinge cam 4a in the hinge assembly H1 complete their slide movements on the guide member 7 and plate spring 5, respectively, the hinge cam 4a is positioned in a state in which its flat surfaces 43a and 44a are in contact with the guide member 7 and plate spring 5, respectively, as shown in FIG. 18a. That is, the curved surfaces 41a and 42a face upwardly and downwardly, respectively, whereas the flat surfaces 43a and 44a extend vertically. In this state, no further rotation of the hinge cam 4a occurs unless an external rotating force is applied to the hinge cam 4a.

In particular, the hinge cam 4a is maintained in the above state because the plate spring 5 and first elastic means 6-1 apply their elastic forces to the hinge cam 4a at opposite sides of the hinge cam 4a, respectively. Practically, however, no further opening of the flip cover 2000 occurs even when an external rotating force is applied to the hinge cam 4a because the flip cover 2000 comes into contact with the anntena unit 1001 when it is further opened. By such a configuration, the opening angle of the flip cover 2000 is limited to about 180°.

In the case of the hinge assembly H2, the hinge cam 4b thereof is positioned in a state in which its flat surfaces 43b and 44b are in contact with the guide member 7 and plate spring 5, respectively, as shown in FIG. 18b. That is, the curved surfaces 41b and 42b face upwardly and downwardly, respectively, whereas the flat surfaces 43b and 44b extend vertically. In this state, no further rotation of the hinge cam 4b occurs unless an external rotating force is applied to the hinge cam 4b. In particular, the hinge cam 4b is maintained in this state because the plate spring 5 and first elastic means 6-1 apply their elastic forces to the hinge cam 4b at opposite sides of the hinge cam 4b, respectively.

In this state, the elastic member 63-1 interposed between opposite ends of the first elastic means 6-1 is in a state in which a minimum biasing force is applied thereto.

On the other hand, FIGS. 19a to 22b illustrate another embodiment of the present invention in which the first elastic means comprises a compression coil spring.

As shown in FIGS. 19a to 22b, each hinge assembly according to this embodiment includes a compression coil spring 6-2 as the first elastic means. This plate spring 6-2 is interposed between the guide member 7 and second cover 8 while being in close contact with the guide member 7 and second cover 8 at their opposite ends, respectively. In this embodiment, no additional elastic means or member is used for the first elastic means. Of course, the present invention is not limited to such a configuration.

Figure 19A:
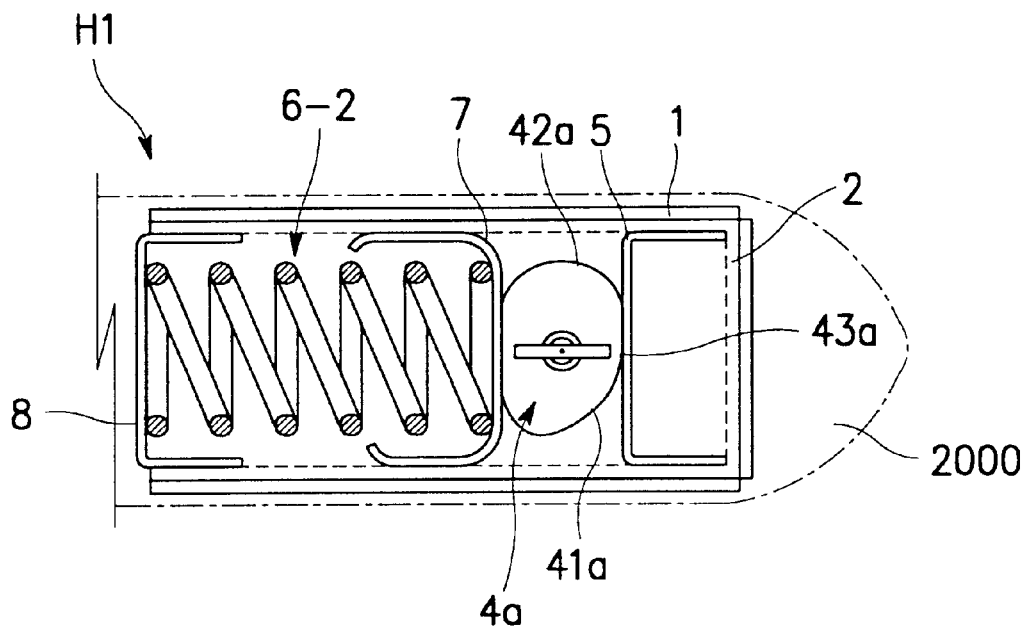
Figure 19B:
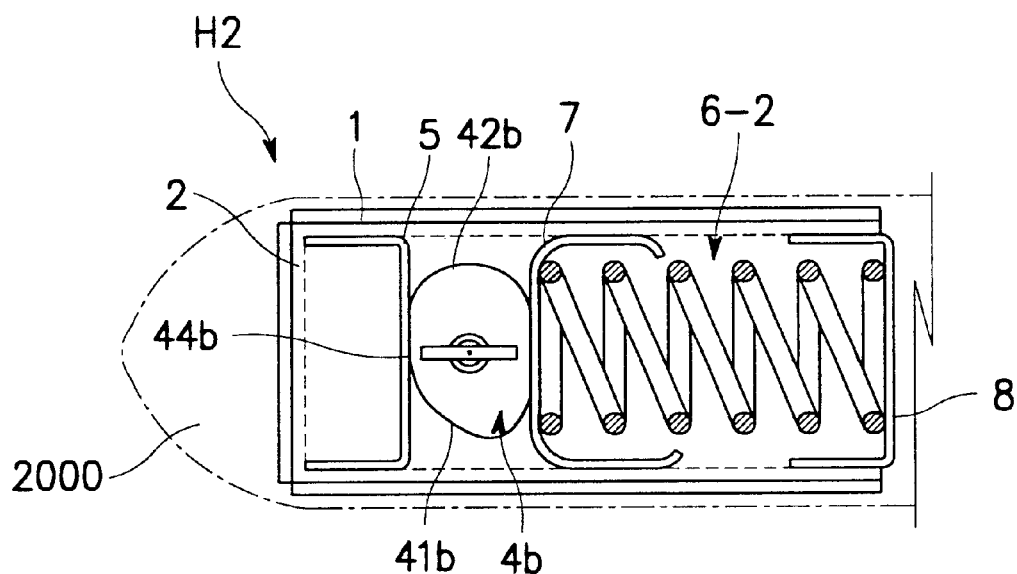

FIGS. 19a and 19b illustrate respective operation states of the hinge assemblies H1 and H2 in a closed state of the flip cover 2000 on the phone body 1000.

As shown in FIG. 19a, where the flip cover 2000 is in its closed state on the phone body 1000, the hinge cam 4a of the hinge assembly H1 is positioned in such a fashion that its curved surfaces 41a and 42a face downwardly and upwardly, respectively, with its flat surfaces 43a and 44a extending vertically. In this state, the flat surfaces 43a and 44a are in surface contact with the plate spring 5 and the guide member 7 elastically supported by the first elastic means 6-2, respectively.

Accordingly, the hinge cam 4a is biased by the plate spring 5 and first elastic means 6-2 at opposite sides thereof, respectively, so that the flat surfaces 43a and 44a are maintained in a state being in close contact with the plate spring 5 and guide member 7 unless an external opening force is applied to the flip cover 2000.

In the case of the hinge assembly H2, the hinge cam 4b thereof is positioned in such a fashion that its curved surfaces 41b and 42b face downwardly and upwardly, respectively, with its flat surfaces 43b and 44b extending vertically, as shown in FIG. 19b. In this state, the flat surfaces 43b and 44b are in surface contact with the plate spring 5 and the guide member 7, respectively. Accordingly, the hinge cam 4b is biased by the plate spring 5 and first elastic means 6-2 at opposite sides thereof, respectively.

Since each of the hinge cams 4a and 4b is biased by the plate spring 5 and first elastic means 6-2 at opposite sides thereof, respectively, it is maintained in the above mentioned state, so that the flip cover 2000 is maintained in its closed state. That is, the flip cover 2000 cannot open by itself unless a certain opening force is applied thereto.

In the closed state of the flip cover 2000, the first elastic means 6-2 is in a state in which it is stretched to the maximum. In this state, accordingly, the elastic force provided by the first elastic means 6-2 is minimum.

Figure 20A:
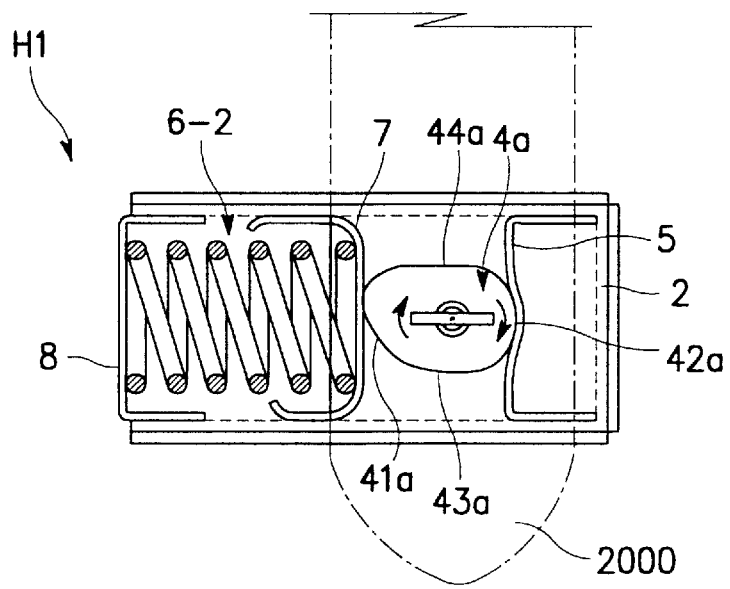
FIGS. 20a and 20b show respective operation states of the hinge assemblies when the flip cover is in an opened state corresponding to an opening angle of 90°.
Figure 20B:
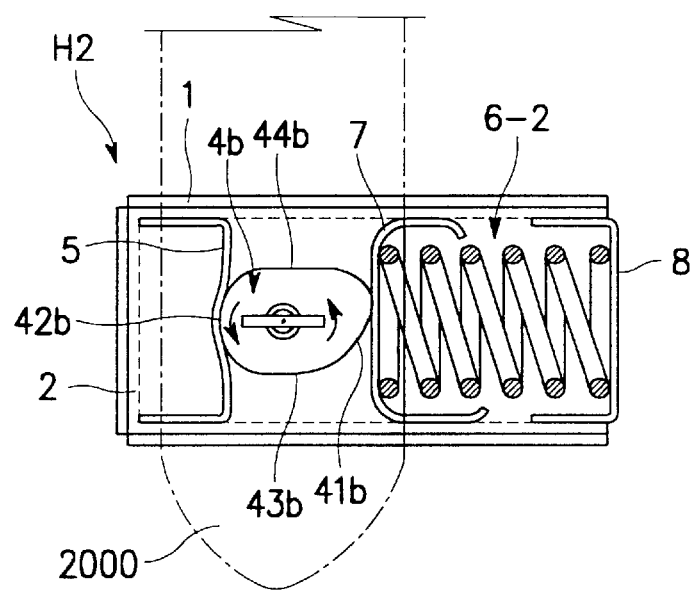

FIGS. 20a and 20b show respective operation states of the hinge assemblies H1 and H2 when the flip cover 2000 is in an opened state corresponding to an opening angle of 90°.

As shown in FIG. 20a, where the flip cover 2000 is opened with an opening angle of 90° to allow the portable phone to be used, the hinge cam 4a of the hinge assembly H1 is positioned in such a fashion that its curved surfaces 41a and 42a face horizontally in opposite directions, respectively, with its flat surfaces 43a and 44a extending horizontally. In this state, the curved surfaces 41a and 42a are closely in surface contact with the guide member 7 and plate spring 5, respectively. As mentioned above, the curved surfaces 41a and 42a are spaced from the axis of the hinge shaft 3a by distances greater than those of the flat surfaces 43a and 44a throughout all portions thereof, respectively. Accordingly, as the hinge cam 4a rotates from the closed position of the flip cover 2000 to a position corresponding to the opening angle of 90°, the curved surfaces 41a and 42a slide along the guide member 7 and plate spring 5 while being in close contact with the guide member 7 and plate spring 5, respectively.

During this rotation of the hinge cam 4a, therefore, the plate spring 5 is slightly depressed at its middle portion. The guide member 7 is also slightly retracted toward the second cover 8. As a result, the plate spring 5 and first elastic means 6-2 apply a maximum elastic force to the hinge cam 4a.

When the hinge cam 4a is in a state rotated to the position corresponding to the opening angle of 90°, the inflection point of the curved surface 41a thereof is in a state already passed the guide member 7. This is because the inflection point of the curved surface 41a is formed at a position where it is spaced by a certain angle in an opening direction of the flip cover 2000 from the Y-axis of an X-Y coordinate defined when the hinge cam 4a is positioned in a state rotated by an opening angle of 90°. Under this condition, accordingly, the elastic forces applied to the hinge cam 4a by the first elastic means 6-2 and the plate spring 5 at opposite sides of the hinge cam 4a serve to further rotate the hinge cam 4a in an opening direction of the flip cover 2000. Therefore, the flip cover 2000 tends to be automatically opened even when there is no external force applied thereto. At this time, the first elastic means 6-2 is in a state in which it is compressed to the maximum. That is, the distance between the guide member 7 and second cover 8 is minimized.

As shown in FIG. 20b, in the case of the hinge assembly H2, the hinge cam 4b thereof is positioned in such a fashion that its curved surfaces 41b and 42b face horizontally in opposite directions, respectively, with its flat surfaces 43b and 44b extending horizontally. In this state, the curved surfaces 41b and 42b are closely in surface contact with the guide member 7 and plate spring 5, respectively. As mentioned above, the curved surfaces 41b and 42b are spaced from the axis of the hinge shaft 3a by distances greater than those of the flat surfaces 43b and 44b throughout all portions thereof, respectively. Accordingly, as the hinge cam 4b rotates from the closed position of the flip cover 2000 to a position corresponding to the opening angle of 90°, the curved surfaces 41b and 42b slide along the guide member 7 and plate spring 5 while being in close contact with the guide member 7 and plate spring 5, respectively.

During this rotation of the hinge cam 4b, therefore, the plate spring 5 is slightly depressed at its middle portion. The guide member 7 is also slightly retracted toward the second cover 8. As a result, the plate spring 5 and first elastic means 6-2 apply a maximum elastic force to the hinge cam 4b. When the hinge cam 4b is in a state rotated to the position corresponding to the opening angle of 90°, the inflection point of the curved surface 41b thereof is in a state already passed the guide member 7. This is because the inflection point of the curved surface 41b is formed at a position where it is spaced by a certain angle in an opening direction of the flip cover 2000 from the Y-axis of an X-Y coordinate defined when the hinge cam 4b is positioned in a state rotated by an opening angle of 90°. Under this condition, accordingly, the elastic forces applied to the hinge cam 4b by the first elastic means 6-2 and the plate spring 5 at opposite sides of the hinge cam 4b serve to further rotate the hinge cam 4b in a direction in which the flip cover 2000 is opened. Therefore, the flip cover 2000 tends to be automatically opened even when there is no external force applied thereto.

Thus, the flip cover 2000 is automatically opened by virtue of the elastic forces applied to the hinge cams 4a and 4b in an opening direction of the flip cover 2000 as indicated by the arrow in FIG. 20a or 20b.

Figure 21A:
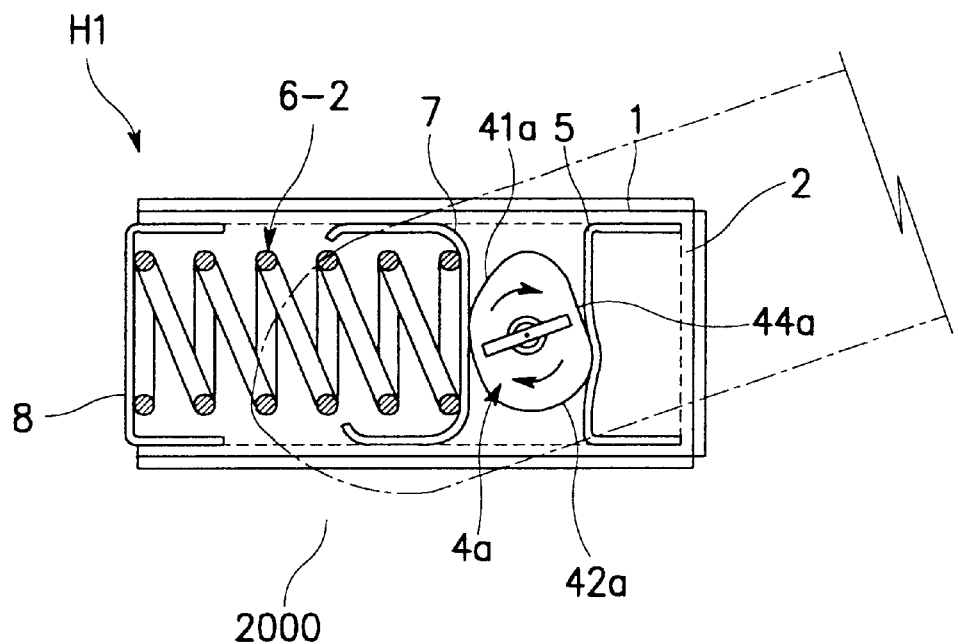
FIGS. 21a and 21b show respective operation states of the hinge assemblies when the flip cover is in an opened state corresponding to an opening angle of 160°.
Figure 21B:
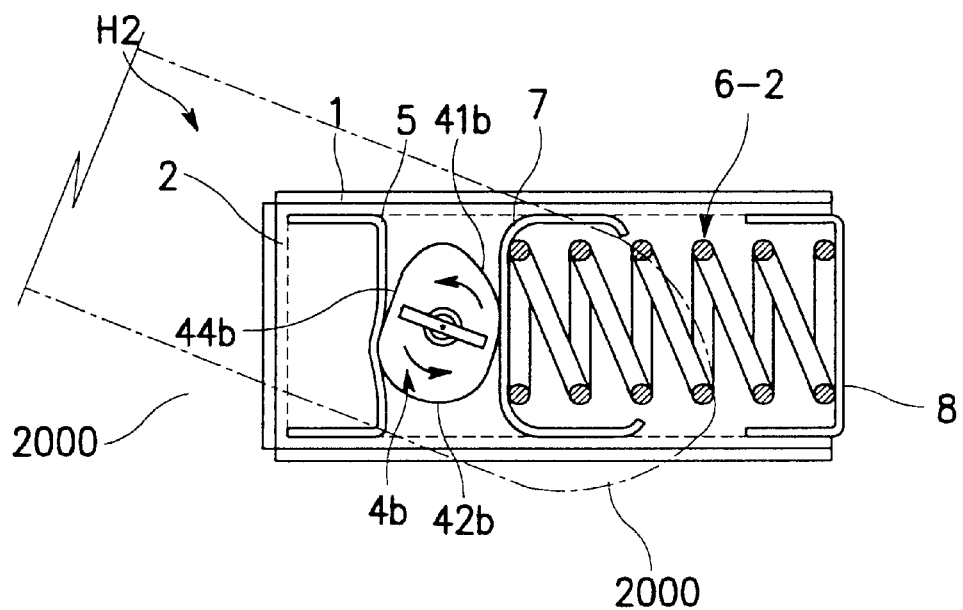

FIGS. 21a and 21b show respective operation states of the hinge assemblies H1 and H2 when the flip cover 2000 is in an opened state corresponding to an opening angle of 160°.

As shown in FIG. 21a, where the flip cover 2000 is opened with an opening angle of 160°, the hinge cam 4a of the hinge assembly H1 is positioned in such a fashion that its curved surfaces 41a and 42a are in close contact with the guide member 7 and plate spring 5 at their portions positioned near the flat surfaces 43a and 44a, respectively. Accordingly, the plate spring 5 and first elastic means 6-2 still apply elastic forces to the hinge cam 4a at opposite sides of the hinge cam 4a, respectively. Since the inflection point of the curved surface 41a has already passed the guide member 7 when the hinge cam 4a rotates by the opening angle of 90°, the elastic forces applied to the hinge cam 4a still serve to further rotate the hinge cam 4a in the opening direction of the flip cover 2000 indicated by the arrow of FIG. 21a, as in the case of FIG. 20a.

In the case of the hinge assembly H2, the hinge cam 4b thereof is positioned in such a fashion that its curved surfaces 41b and 42b are in close contact with the guide member 7 and plate spring 5 at their portions positioned near the flat surfaces 43b and 44b, respectively, as shown in FIG. 21b. Accordingly, the plate spring 5 and first elastic means 6-2 still apply elastic forces to the hinge cam 4b at opposite sides of the hinge cam 4b, respectively. Since the inflection point of the curved surface 41b has already passed the guide member 7 when the hinge cam 4b rotates by the opening angle of 90°, the elastic forces applied to the hinge cam 4b still serve to further rotate the hinge cam 4b in the opening direction of the flip cover 2000 indicated by the arrow of FIG. 21b, as in the case of FIG. 20b.

Thus, the flip cover 2000 is completely opened by virtue of the elastic forces applied to the hinge cams 4a and 4b in the opening direction of the flip cover 2000.

Figure 22A:
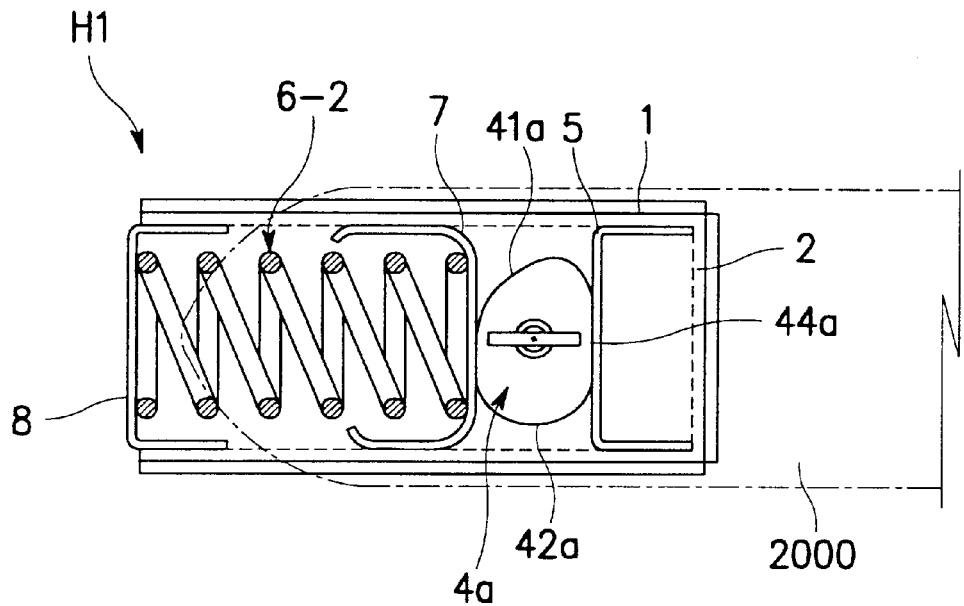
Figure 22B:
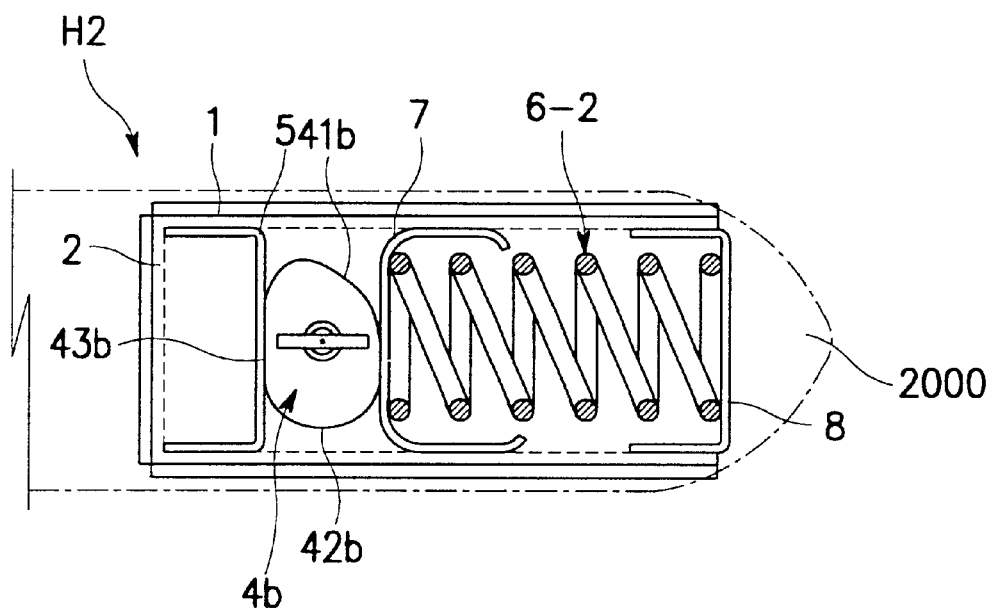

FIGS. 22a and 22b show respective operation states of the hinge assemblies H1 and H2 when the flip cover 2000 is in a completely opened state.

When the flip cover 2000 is opened in such a fashion that the curved surfaces 41a and 42a of the hinge cam 4a in the hinge assembly H1 complete their slide movements on the guide member 7 and plate spring 5, respectively, the hinge cam 4a is positioned in a state in which its flat surfaces 43a and 44a are in contact with the guide member 7 and plate spring 5, respectively, as shown in FIG. 22a. That is, the curved surfaces 41a and 42a face upwardly and downwardly, respectively, whereas the flat surfaces 43a and 44a extend vertically. In this state, no further rotation of the hinge cam 4a occurs unless an external rotating force is applied to the hinge cam 4a. In particular, the hinge cam 4a is maintained in the above state because the plate spring 5 and first elastic means 6-2 apply their elastic forces to the hinge cam 4a at opposite sides of the hinge cam 4a, respectively. Practically, however, no further opening of the flip cover 2000 occurs even when an external rotating force is applied to the hinge cam 4a because the flip cover 2000 comes into contact with the antenna unit 1001 when it is further opened. By such a configuration, the opening angle of the flip cover 2000 is limited to about 180°.

In the case of the hinge assembly H2, the hinge cam 4b thereof is positioned in a state in which its flat surfaces 43b and 44b are in contact with the guide member 7 and plate spring 5, respectively, as shown in FIG. 18b. That is, the curved surfaces 41b and 42b face upwardly and downwardly, respectively, whereas the flat surfaces 43b and 44b extend vertically. In this state, no further rotation of the hinge cam 4b occurs unless an external rotating force is applied to the hinge cam 4b. In particular, the hinge cam 4b is maintained in this state because the plate spring 5 and first elastic means 6-2 apply their elastic forces to the hinge cam 4b at opposite sides of the hinge cam 4b, respectively. By such a configuration, the opening angle of the flip cover 2000 is limited to about 180°.

On the other hand, FIGS. 23a to 26b illustrate another embodiment of the present invention in which the first elastic means comprises an elastic member made of a urethane material.

As shown in FIGS. 23a to 26b, each hinge assembly according to this embodiment includes an elastic member 6-3 as the first elastic means. This elastic member 6-3 has a trapezoidal cross-section and is interposed between the guide member 7 and second cover 8. That is, the elastic member 6-3 is in contact with the guide member 7 at its end having a smaller cross-sectional area and with the second cover 8 at its end having a larger cross-sectional area. In this embodiment, no additional elastic means or member is used for the first elastic means. Of course, the present invention is not limited to such a configuration.

Figure 23A:
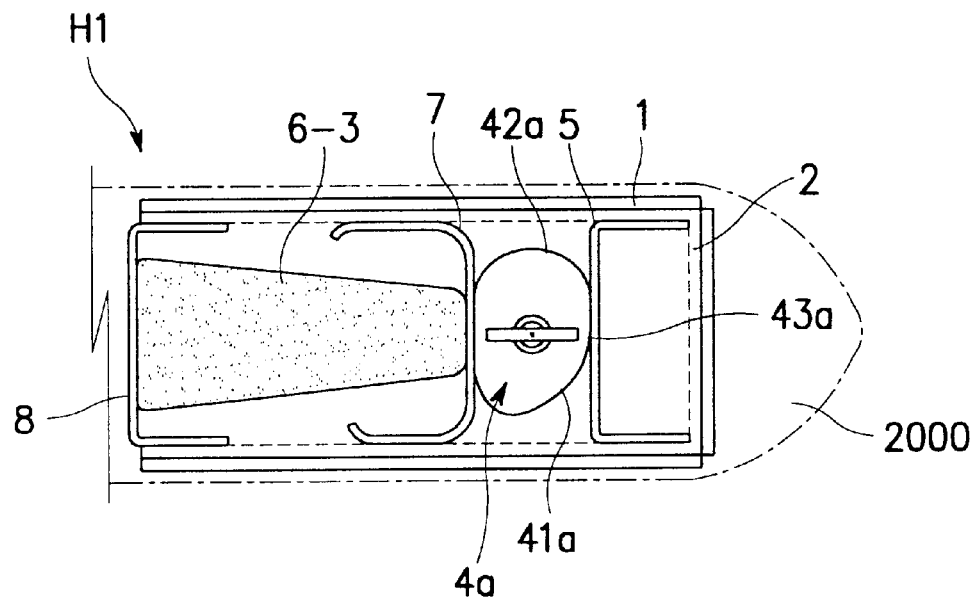
Figure 23B:
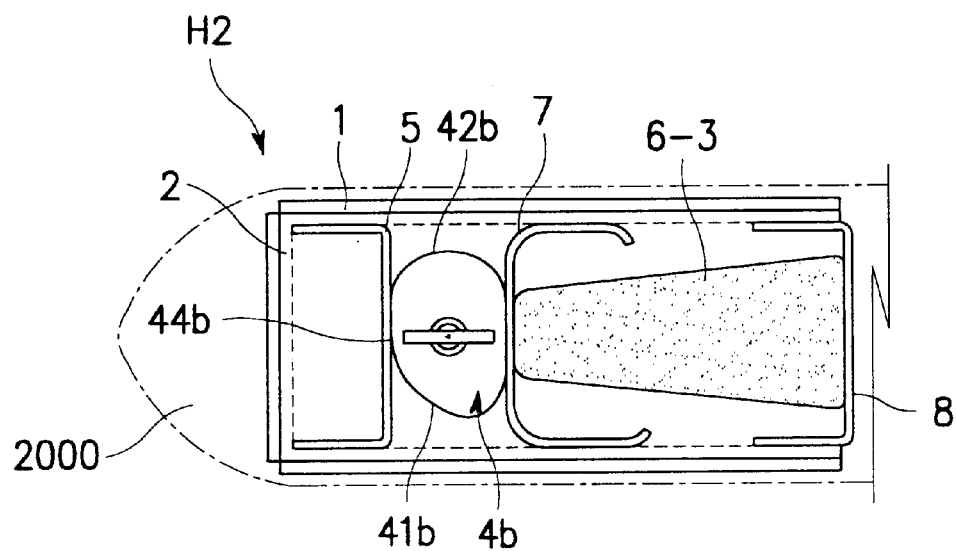

FIGS. 23a and 23b illustrate respective operation states of the hinge assemblies H1 and H2 in a closed state of the flip cover 2000 on the phone body 1000.

As shown in FIG. 23a, where the flip cover 2000 is in its closed state on the phone body 1000, the hinge cam 4a of the hinge assembly H1 is positioned in such a fashion that its curved surfaces 41a and 42a face downwardly and upwardly, respectively, with its flat surfaces 43a and 44a extending vertically. In this state, the flat surfaces 43a and 44a are in surface contact with the plate spring 5 and the guide member 7 elastically supported by the first elastic means 6-3, respectively. Accordingly, the hinge cam 4a is biased by the plate spring 5 and first elastic means 6-3 at opposite sides thereof, respectively, so that the flat surfaces 43a and 44a are maintained in a state being in close contact with the plate spring 5 and guide member 7 unless an external opening force is applied to the flip cover 2000.

In the case of the hinge assembly H2, the hinge cam 4b thereof is positioned in such a fashion that its curved surfaces 41b and 42b face downwardly and upwardly, respectively, with its flat surfaces 43b and 44b extending vertically, as shown in FIG. 23b. In this state, the flat surfaces 43b and 44b are in surface contact with the plate spring 5 and the guide member 7, respectively. Accordingly, the hinge cam 4b is biased by the plate spring 5 and first elastic means 6-3 at opposite sides thereof, respectively.

Since each of the hinge cams 4a and 4b is biased by the plate spring 5 and first elastic means 6-3 at opposite sides thereof, respectively, it is maintained in the above mentioned state, so that the flip cover 2000 is maintained in its closed state. That is, the flip cover 2000 cannot open by itself unless a certain opening force is applied thereto. In the closed state of the flip cover 2000, the first elastic means 6-3 is in a state in which it is stretched to the maximum. In this state, accordingly, the elastic force provided by the first elastic means 6-3 is minimum.

Figure 24A:
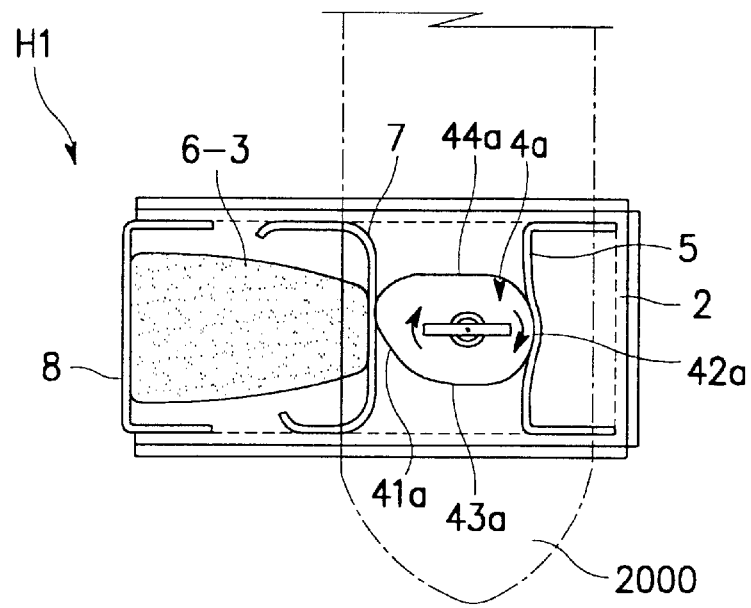
FIGS. 24a and 24b show respective operation states of the hinge assemblies when the flip cover is in an opened state corresponding to an opening angle of 90°.
Figure 24B:
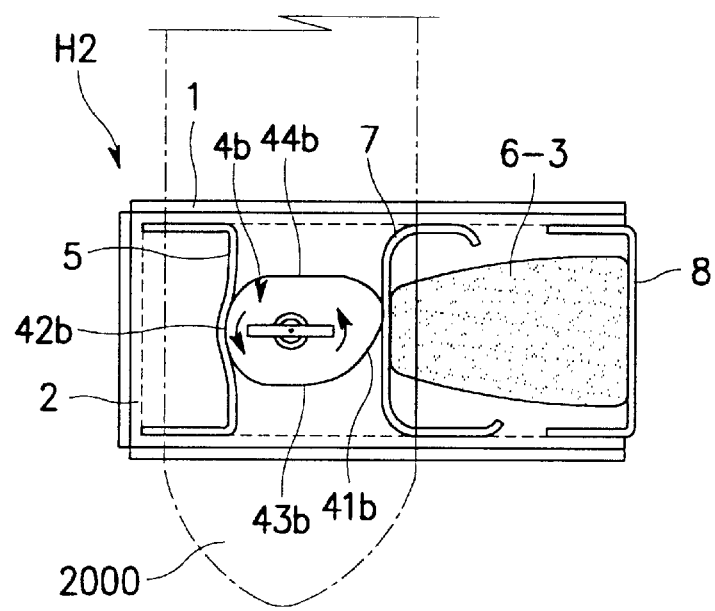

FIGS. 24a and 24b show respective operation states of the hinge assemblies H1 and H2 when the flip cover 2000 is in an opened state corresponding to an opening angle of 90°.

As shown in FIG. 24a, where the flip cover 2000 is opened with an opening angle of 90° to allow the portable phone to be used, the hinge cam 4a of the hinge assembly H1 is positioned in such a fashion that its curved surfaces 41a and 42a face horizontally in opposite directions, respectively, with its flat surfaces 43a and 44a extending horizontally. In this state, the curved surfaces 41a and 42a are closely in surface contact with the guide member 7 and plate spring 5, respectively. As mentioned above, the curved surfaces 41a and 42a are spaced from the axis of the hinge shaft 3a by distances greater than those of the flat surfaces 43a and 44a throughout all portions thereof, respectively. Accordingly, as the hinge cam 4a rotates from the closed position of the flip cover 2000 to a position corresponding to the opening angle of 90°, the curved surfaces 41a and 42a slide along the guide member 7 and plate spring 5 while being in close contact with the guide member 7 and plate spring 5, respectively.

During this rotation of the hinge cam 4a, therefore, the plate spring 5 is slightly depressed at its middle portion. The guide member 7 is also slightly retracted toward the second cover 8. As a result, the plate spring 5 and first elastic means 6-3 apply a maximum elastic force to the hinge cam 4a. At this time, the distance between the guide member 7 and second cover 8 is minimized.

When the hinge cam 4a is in a state rotated to the position corresponding to the opening angle of 90°, the inflection point of the curved surface 41a thereof is in a state already passed the guide member 7. This is because the inflection point of the curved surface 41a is formed at a position where it is spaced by a certain angle in an opening direction of the flip cover 2000 from the Y-axis of an X-Y coordinate defined when the hinge cam 4a is positioned in a state rotated by an opening angle of 90°. Under this condition, accordingly, the elastic forces applied to the hinge cam 4a by the first elastic means 6-3 and the plate spring 5 at opposite sides of the hinge cam 4a serve to further rotate the hinge cam 4a in an opening direction of the flip cover 2000. Therefore, the flip cover 2000 tends to be automatically opened even when there is no external force applied thereto. At this time, the first elastic means 6-3 is in a state in which it is compressed to the maximum.

As shown in FIG. 24b, in the case of the hinge assembly H2, the hinge cam 4b thereof is positioned in such a fashion that its curved surfaces 41b and 42b face horizontally in opposite directions, respectively, with its flat surfaces 43b and 44b extending horizontally. In this state, the curved surfaces 41b and 42b are closely in surface contact with the guide member 7 and plate spring 5, respectively. As mentioned above, the curved surfaces 41b and 42b are spaced from the axis of the hinge shaft 3a by distances greater than those of the flat surfaces 43b and 44b throughout all portions thereof, respectively. Accordingly, as the hinge cam 4b rotates from the closed position of the flip cover 2000 to a position corresponding to the opening angle of 90°, the curved surfaces 41b and 42b slide along the guide member 7 and plate spring 5 while being in close contact with the guide member 7 and plate spring 5, respectively.

During this rotation of the hinge cam 4b, therefore, the plate spring 5 is slightly depressed at its middle portion. The guide member 7 is also slightly retracted toward the second cover 8. As a result, the plate spring 5 and first elastic means 6-3 apply a maximum elastic force to the hinge cam 4b. At this time, the first elastic means 6-3 is in a state in which it is compressed to the maximum. When the hinge cam 4b is in a state rotated to the position corresponding to the opening angle of 90°, the inflection point of the curved surface 41b thereof is in a state already passed the guide member 7. This is because the inflection point of the curved surface 41b is formed at a position where it is spaced by a certain angle in an opening direction of the flip cover 2000 from the Y-axis of an X-Y coordinate defined when the hinge cam 4b is positioned in a state rotated by an opening angle of 90°. Under this condition, accordingly, the elastic forces applied to the hinge cam 4b by the first elastic means 6-3 and the plate spring 5 at opposite sides of the hinge cam 4b serve to further rotate the hinge cam 4b in an opening direction of the flip cover 2000. Therefore, the flip cover 2000 tends to be automatically opened even when there is no external force applied thereto.

Thus, the flip cover 2000 is automatically opened by virtue of the elastic forces applied to the hinge cams 4a and 4b in an opening direction of the flip cover 2000 as indicated by the arrow in FIG. 24a or 24b.

Figure 25A:
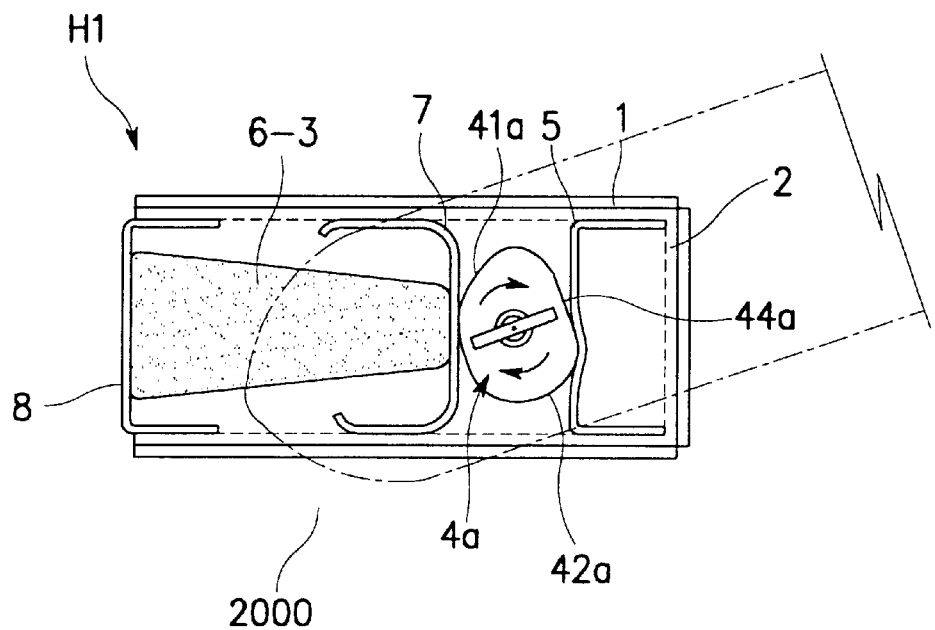
FIGS. 25a and 25b show respective operation states of the hinge assemblies when the flip cover is in an opened state corresponding to an opening angle of 160°.
Figure 25B:
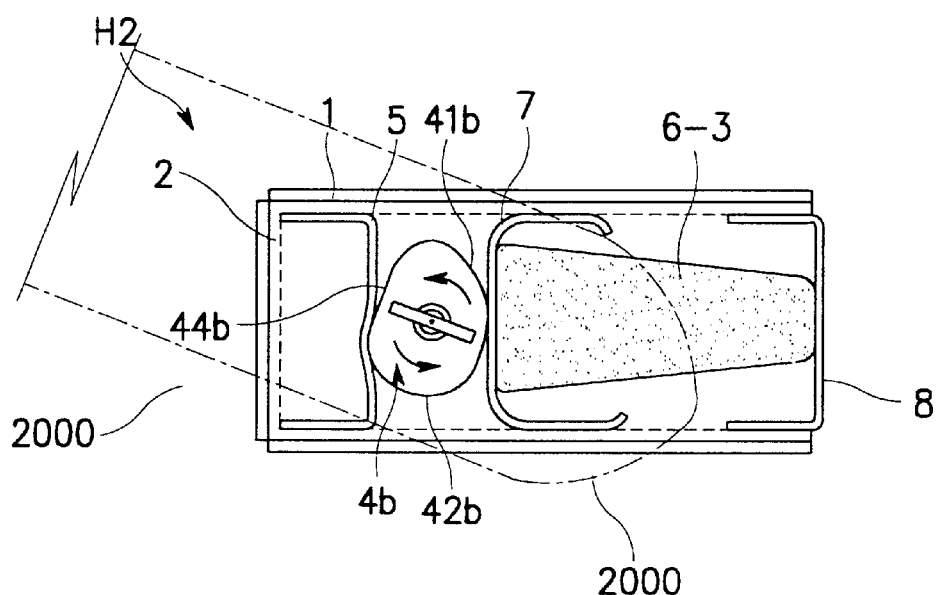

FIGS. 25a and 25b show respective operation states of the hinge assemblies H1 and H2 when the flip cover 2000 is in an opened state corresponding to an opening angle of 160°.

As shown in FIG. 25a, where the flip cover 2000 is opened with an opening angle of 160°, the hinge cam 4a of the hinge assembly H1 is positioned in such a fashion that its curved surfaces 41a and 42a are in close contact with the guide member 7 and plate spring 5 at their portions positioned near the flat surfaces 43a and 44a, respectively. Accordingly, the plate spring 5 and first elastic means 6-3 still apply elastic forces to the hinge cam 4a at opposite sides of the hinge cam 4a, respectively. Since the inflection point of the curved surface 41a has already passed the guide member 7 when the hinge cam 4a rotates by the opening angle of 90°, the elastic forces applied to the hinge cam 4a still serve to further rotate the hinge cam 4a in the opening direction of the flip cover 2000 indicated by the arrow of FIG. 25a, as in the case of FIG. 24a.

In the case of the hinge assembly H2, the hinge cam 4b thereof is positioned in such a fashion that its curved surfaces 41b and 42b are in close contact with the guide member 7 and plate spring 5 at their portions positioned near the flat surfaces 43b and 44b, respectively, as shown in FIG. 25b. Accordingly, the plate spring 5 and first elastic means 6-3 still apply elastic forces to the hinge cam 4b at opposite sides of the hinge cam 4b, respectively. Since the inflection point of the curved surface 41b has already passed the guide member 7 when the hinge cam 4b rotates by the opening angle of 90°, the elastic forces applied to the hinge cam 4b still serve to further rotate the hinge cam 4b in the opening direction of the flip cover 2000 indicated by the arrow of FIG. 25b, as in the case of FIG. 24b.

Thus, the flip cover 2000 is completely opened by virtue of the elastic forces applied to the hinge cams 4a and 4b in the opening direction of the flip cover 2000.

Figure 26A:
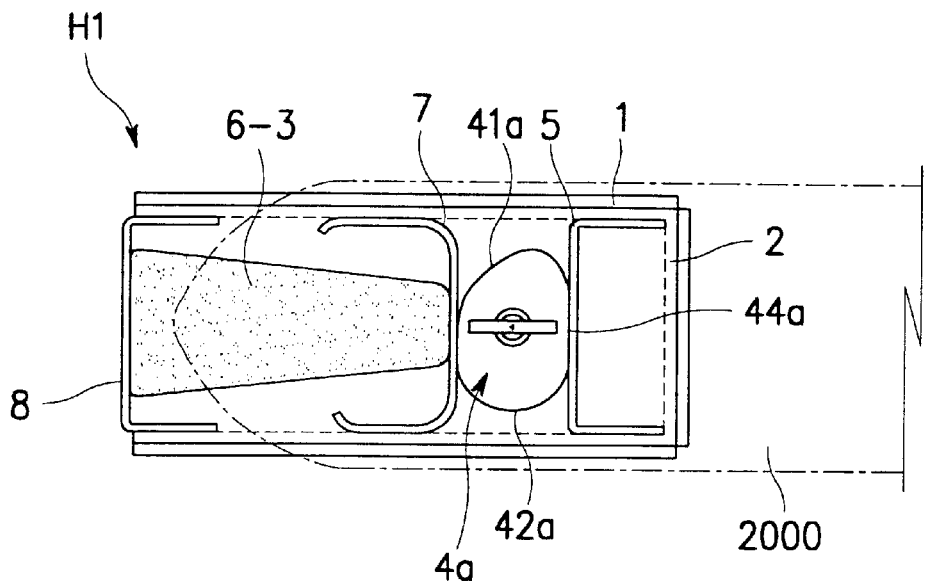
Figure 26B:
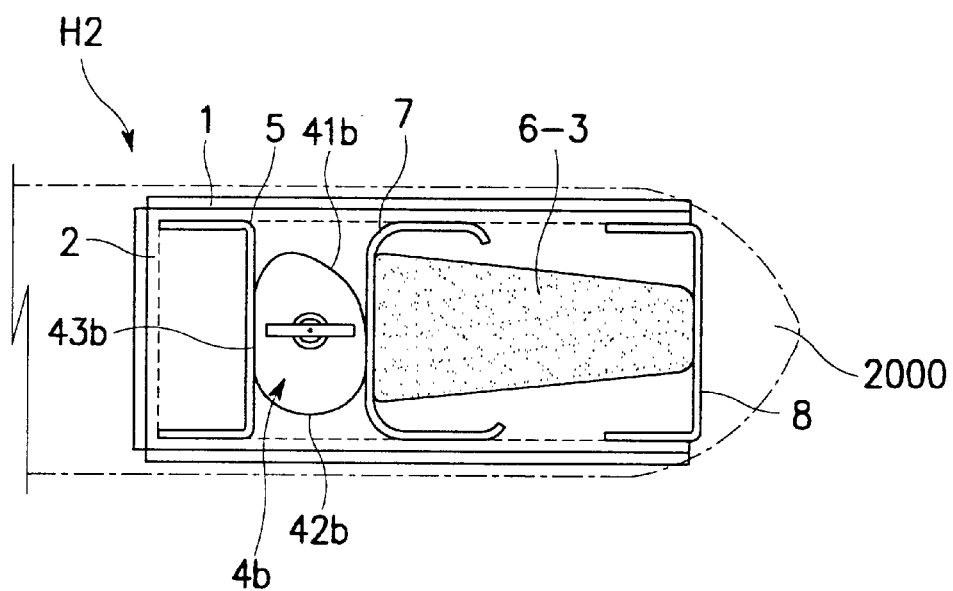

FIGS. 26a and 26b show respective operation states of the hinge assemblies H1 and H2 when the flip cover 2000 is in a completely opened state.

When the flip cover 2000 is opened in such a fashion that the curved surfaces 41a and 42a of the hinge cam 4a in the hinge assembly H1 complete their slide movements on the guide member 7 and plate spring 5, respectively, the hinge cam 4a is positioned in a state in which its flat surfaces 43a and 44a are in contact with the guide member 7 and plate spring 5, respectively, as shown in FIG. 26a. That is, the curved surfaces 41a and 42a face upwardly and downwardly, respectively, whereas the flat surfaces 43a and 44a extend vertically. In this state, no further rotation of the hinge cam 4a occurs unless an external rotating force is applied to the hinge cam 4a. In particular, the hinge cam 4a is maintained in the above state because the plate spring 5 and first elastic means 6-3 apply their elastic forces to the hinge cam 4a at opposite sides of the hinge cam 4a, respectively. Practically, however, no further opening of the flip cover 2000 occurs even when an external rotating force is applied to the hinge cam 4a because the flip cover 2000 comes into contact with the antenna unit 1001 when it is farther opened. By such a configuration, the opening angle of the flip cover 2000 is limited to about 180°.

In the case of the hinge assembly H2, the hinge cam 4b thereof is positioned in a state in which its flat surfaces 43b and 44b are in contact with the guide member 7 and plate spring 5, respectively, as shown in FIG. 26b. That is, the curved surfaces 41b and 42b face upwardly and downwardly, respectively, whereas the flat surfaces 43b and 44b extend vertically. In this state, no further rotation of the hinge cam 4b occurs unless an external rotating force is applied to the hinge cam 4b. In particular, the hinge cam 4b is maintained in this state because the plate spring 5 and first elastic means 6-3 apply their elastic forces to the hinge cam 4b at opposite sides of the hinge cam 4b, respectively.

Although various embodiments of the first elastic means have been described, elastic means not illustrated herein, but conceivable in the technical field, may also be employed in accordance with the present invention.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

As apparent from the above description, the present invention provides a flip-up type portable phone including a mechanism capable of connecting a speaker mounted in a flip cover to a phone body, thereby achieving a compactness of the phone body. The flip-up type portable phone of the present invention also includes a hinge mechanism having an improved configuration capable of achieving a compactness of the phone body. Since the hinge mechanism has a compact construction, it contributes to a diversification in design for portable phones.

Moreover, the speaker mounted in the flip cover is spaced and isolated from a battery pack separably attached to the back surface of the phone body. Accordingly, the speaker is not influenced by heat generated from the battery pack.

Since the speaker is contained in the flip cover, it is spaced and isolated from an antenna unit mounted to the phone body, so that it is subjected to minimum electric wave influence by the antenna unit.

The hinge mechanism includes a pair of hinge assemblies respectively arranged at opposite sides of an LCD module disposed at the upper portion of the phone body. Accordingly, a microphone unit can be arranged at the lower end of the phone body. Moreover, the microphone unit may be arranged at an optional position, for example, a left, middle or right position, on the lower end of the phone body. In accordance with such an arrangement, the LCD unit is always exposed. This provides a convenience in use to the user.

What is claimed is:

1. A flip up type portable phone comprising:
   a phone body including an antenna unit arranged at an upper end of said phone body, a liquid crystal display module arranged below said antenna unit, said liquid crystal display module serving as output means for displaying information, a key pad arranged adjacent said liquid crystal display module, said key pad serving as input means, and a microphone unit arranged adjacent said key pad;
   a flip cover mounted to said phone body in such a fashion that it may be opened and closed with respect to said phone body without covering said liquid crystal display module, said flip cover serving to cover said key pad when in a closed position;

a pair of hinge means, wherein one of said pair is mounted to each side of said phone body to mechanically couple said flip cover to said phone body, and wherein each one of said pair of hinge means is mounted to said phone body at opposite sides of said liquid crystal display module; and fixing means for fixing said flip cover to said hinge means;

whereby said liquid crystal display module is always exposed so that said information displayed thereon may always be identified irrespective of an opened or closed state of said flip cover.

2. The flip-up type portable phone in accordance with claim 1, wherein said hinge means is mounted to said phone body in a symmetrical manner.

3. The flip-up type portable phone in accordance with claim 1, wherein said flip cover comprises:

an outer case;

an inner case coupled to said outer case in such a fashion to define a space therebetween;

an ear piece contained in said space and provided with a speaker, said ear piece constituting a portion of said inner case; and a pair of spaced necks extending in a symmetrical manner from an end of said outer case disposed away from said ear piece, each of said necks having a knuckle at a free end thereof.

4. The flip-up type portable phone in accordance with claim 3, wherein each of said necks further has speaker connecting means for electrically connecting said speaker contained in said flip cover to said phone body.

5. The flip-up type portable phone in accordance with claim 4, wherein said speaker connecting means comprises a wire passage extending longitudinally through said neck for allowing an associated wire extending from said speaker to pass therethrough.

6. The flip-up type portable phone in accordance with claim 5, wherein said wire passage is formed using a gas injection process.

7. The flip-up type portable phone in accordance with claim 4, wherein said speaker connecting means comprises:

a wire groove formed at said neck while extending longitudinally along said neck, said wire groove receiving an associated wire extending from said speaker; and a fitting member fitted in said wire groove in such a fashion that said fitting member hides said wire received in said wire groove, said fitting member having a shape conforming to that of said wire groove.

8. The flip-up type portable phone in accordance with claim 3, wherein said ear piece is made of an elastomeric material independent of a material of said inner case.

9. The flip-up type portable phone in accordance with claim 3, wherein said fixing means comprises:

an insert fixedly mounted to each of said knuckles;

a flip dummy member assembled to each one of said pair of hinge means; and a set screw threadedly coupled to said insert and adapted to tightly clamp said assembled flip dummy member and hinge means to an associated one of said knuckles.

10. The flip-up type portable phone in accordance with claim 9, wherein said flip dummy member has a hollow body, a through hole vertically formed through an upper wall of said hollow body and adapted to allow said set screw to extend vertically therethrough to an associated one of said inserts, an inlet wire hole for receiving a wire extending from said speaker via an associated one of said necks and communicating with the interior of said hollow body, and an outlet wire hole formed through a portion of said hollow body near a bottom of said hollow body.

11. A hinge mechanism for a flip-up type portable phone comprising:

a hinge housing provided with a plurality of locking protrusions;

a first cover made of a plastic material and assembled in said hinge housing, said first cover having a plurality of locking holes formed at positions corresponding to those of said locking protrusions in an assembled state of said first cover, so that said locking holes are engaged with said locking protrusions in said assembled state, respectively, said first cover also having additional locking holes;

a hinge shaft arranged in such a fashion that it extends transversely through said first cover and said hinge housing, said hinge shaft having an inner end disposed in a space defined by said first cover assembled in said hinge housing, and an outer end disposed outside said space and provided with a coupling member centrally having a coupling hole;

a hinge cam fixed to said inner end of said hinge shaft and provided with opposite curved surfaces, and opposite flat surfaces arranged in an alternating manner with said curved surfaces, one of said curved surfaces having an inflection point at a position spaced by a predetermined angle in an opening direction of a flip cover included in said phone from a position corresponding to a predetermined angular position of said flip cover, so that said flip cover is not stopped at said predetermined angular position during opening and closing movements thereof, a plate spring interposed between said hinge cam and a side wall formed at one end of said hinge housing and adapted to apply an elastic force to said hinge cam at one side of said hinge cam, said plate spring being in slidable surface contact with said surfaces of the hinge cam during a rotation of said hinge cam;

first elastic means arranged at a second side of said hinge cam and adapted to apply an elastic force to said hinge cam at said second side of said hinge cam, said first elastic means being sequentially compressed and stretched in said space defined by said first cover during said rotation of said hinge cam; and a second cover adapted to support said first elastic means at the other end of said hinge housing, said second cover having locking protrusions formed at positions corresponding to those of said additional locking holes of said first cover and engaged with said locking protrusions, respectively, so that it may be coupled to said first cover.

12. The hinge mechanism in accordance with claim 11, wherein said first elastic means comprises a plate spring having an S-shaped cross section, said plate spring being supported by said hinge cam and said second cover at opposite ends thereof, respectively, in such a fashion that said plate spring may be sequentially compressed and stretched during said rotation of said hinge cam.

13. The hinge mechanism in accordance with claim 11, wherein said first elastic means comprises a plate spring having a C-shaped cross section, said plate spring being supported by said hinge cam and said second cover, respectively, in such a fashion that said plate spring may be sequentially compressed and stretched during said rotation of said hinge cam.

14. The hinge mechanism in accordance with claim 11, wherein said first elastic means comprises a compression coil spring supported by said hinge cam and said second cover at opposite ends thereof, respectively, in such a fashion that said compression coil spring may be sequentially compressed and stretched during said rotation of said hinge cam.

15. The hinge mechanism in accordance with claim 11, wherein said first elastic means comprises an elastic member having a trapezoidal cross section, said elastic member being made of a urethane material exhibiting a flexibility and supported by said hinge cam and said second cover at opposite ends thereof, respectively, in such a fashion that said elastic member may be sequentially compressed and stretched during said rotation of said hinge cam.

16. The hinge mechanism in accordance with claim 11, further comprising a guide member interposed between said first elastic means and said hinge cam, said guide member having a shape surrounding a facing end of said first elastic means and serving to guide straight movements of said first elastic means being compressed and stretched, said guide member also having opposite ends having an inwardly bent shape.

17. The hinge mechanism in accordance with claim 16, wherein said guide member is made of a metal material.

18. The hinge mechanism in accordance with claim 12, further comprising a pair of second elastic means each having a half-moon shape, said second elastic means being interposed between said opposite ends of said S-shaped plate spring to minimize a fatigue phenomenon occurring at said plate spring being compressed and stretched.

19. The hinge mechanism in accordance with claim 13, further comprising second elastic means having a half-moon shape, said second elastic means being interposed between said opposite ends of said C-shaped plate spring to minimize a fatigue phenomenon occurring at said plate spring being compressed and stretched.

20. The hinge mechanism in accordance with claim 18, wherein said second elastic means is made of a urethane material exhibiting a flexibility.

21. The hinge mechanism in accordance with claim 19, wherein said second elastic means is made of a urethane material exhibiting a flexibility.

22. The hinge mechanism in accordance with claim 12, wherein said plate spring has a multi-ply structure to provide a superior operability to said flip cover being opened and closed.

23. The hinge mechanism in accordance with claim 13, wherein said plate spring has a multi-ply structure to provide a superior operability to said flip cover being opened and closed.

24. The hinge mechanism in accordance with claim 11, wherein said first cover further has a circular mounting hole allowing said outer end of said hinge shaft to pass therethrough and supporting said hinge shaft, and a slot extending laterally from opposite sides of said shaft hole and serving as a port for supplying a lubricant around said hinge shaft.

25. The hinge mechanism in accordance with claim 11, wherein said predetermined angle is about 10°.

* * * * *